United States Patent
Kwak et al.

(10) Patent No.: US 8,102,811 B2
(45) Date of Patent: Jan. 24, 2012

(54) PROVIDING MOBILITY MANAGEMENT PROTOCOL INFORMATION TO A MOBILE TERMINAL FOR PERFORMING HANDOVER IN A MOBILE COMMUNICATION SYSTEM

(75) Inventors: Yong Won Kwak, Gyeonggi-do (KR); Yong Ho Kim, Gyeonggi-do (KR); Jin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 996 days.

(21) Appl. No.: 11/369,685

(22) Filed: Mar. 6, 2006

(65) Prior Publication Data

US 2006/0268782 A1 Nov. 30, 2006

(30) Foreign Application Priority Data

Mar. 7, 2005 (KR) .................. 10-2005-0018856
Apr. 29, 2005 (KR) .................. 10-2005-0036426

(51) Int. Cl.
*H04W 4/00* (2009.01)
(52) U.S. Cl. ........ 370/331; 370/252; 370/392; 370/400; 370/389; 370/412; 370/351; 370/254; 455/448; 455/450; 455/442
(58) Field of Classification Search ............. 370/412, 370/351, 254, 252, 392, 400, 389, 448, 450, 370/310, 235, 352, 328, 331, 332, 395.1, 370/468, 238; 455/442, 448, 450, 427, 456.1, 455/517, 436, 552.1, 444, 425; 709/223, 709/251, 230
See application file for complete search history.

(56) References Cited

U.S. PATENT DOCUMENTS 6,925,074 B1 * 8/2005 Vikberg et al. ............... 370/338
7,254,138 B2 * 8/2007 Sandstrom .................... 370/412
(Continued)

FOREIGN PATENT DOCUMENTS

CN 1505910 6/2004
(Continued)

OTHER PUBLICATIONS

Gupta, V. et al.: "A generalized model for link layer triggers." IEEE 802.21 Working Group. Mar. 1, 2004.
Liu, X. et al.: "Initial Proposal for IEEE 802.21 from Samsung", IEEE 802.21 Working Group [online], Jan. 10, 2005 [retrieved on Jun. 20, 2006]. Retrieved from the Internet: <URL:http://www.ieee802.org/21/doctree/2005-01__meeting-docs/21-04-0171-00-0000-Samsung__MIH__Proposal.doc>. figure 1, sections 5.2.1.1.1-5.2.1.1.4, 6.2.2.3, 6.2.2.4, 10.1.

(Continued)

*Primary Examiner* — Rafael Pérez-Gutiérrez
*Assistant Examiner* — Joseph Arevalo
(74) *Attorney, Agent, or Firm* — Lee, Hong, Degerman, Kang & Waimey

(57) ABSTRACT

The present invention relates to providing mobility management protocol information to a multi-mode mobile terminal for performing handover between heterogeneous networks. Preferably, the present invention establishes a unified interface to an upper layer of the mobile terminal for managing messages to and from at least one of a homogeneous network and a heterogeneous network, establishes a connection with an accessible link of at least one of a homogeneous network and a heterogeneous network for performing handover, and receives in the upper layer information from the unified interface related to the established connection. Preferably, the step of receiving the information includes receiving mobility management protocol information of the at least one of a homogeneous network and a heterogeneous network. Accordingly, the mobile terminal reduces a time duration for establishing a Care of Address (CoA) using a new mobility management protocol of a new network the mobile terminal has been handed over to.

23 Claims, 30 Drawing Sheets

U.S. PATENT DOCUMENTS

| | | |
|---|---|---|
| 7,496,951 B2 * | 2/2009 | Okazawa et al. ................ 726/3 |
| 7,684,342 B2 * | 3/2010 | Gupta et al. ................ 370/252 |
| 2002/0062385 A1 * | 5/2002 | Dowling ................ 709/230 |
| 2003/0120822 A1 * | 6/2003 | Langrind et al. ................ 709/251 |
| 2004/0031030 A1 * | 2/2004 | Kidder et al. ................ 717/172 |
| 2004/0032856 A1 * | 2/2004 | Sandstrom ................ 370/351 |
| 2004/0067754 A1 * | 4/2004 | Gao et al. ................ 455/442 |
| 2004/0116120 A1 * | 6/2004 | Gallagher et al. ................ 455/436 |
| 2005/0198247 A1 * | 9/2005 | Perry et al. ................ 709/223 |
| 2006/0140150 A1 * | 6/2006 | Olvera-Hernandez et al. ................ 370/331 |
| 2006/0187858 A1 * | 8/2006 | Kenichi et al. ................ 370/254 |
| 2006/0258355 A1 * | 11/2006 | Olvera-Hernandez et al. ................ 455/436 |

FOREIGN PATENT DOCUMENTS

| | | |
|---|---|---|
| JP | 11-355322 | 12/1999 |
| WO | WO 01/31963 A1 | 5/2001 |
| WO | WO 2004/021620 A2 | 3/2004 |

OTHER PUBLICATIONS

Gupta, V. et al..: "Media Independent Handover", IEEE 802.21 Working Group [online], Jan. 14, 2005 [retrieved on Jun. 20, 2006]. Retrieved from the Internet: <URL: http://www.ieee802.org/21/doctree/2005-01_meeting_docs/21-04-0168-00-0000-Joint_MIH_Proposal Draft_Text.doc>. figures 1, 2, section 6.4.

* cited by examiner

FIG. 8

| 0 | 8 | 16 | 24 | 31 |
|---|---|---|---|---|
| OP | HTYPE | HLEN | HOPS | |
| TRANSACTION IDENTIFIER ||||
| SECONDS ELAPSED || FLAGS ||
| CLIENT IP ADDRESS ||||
| VOUR IP ADDRESS ||||
| SERVER IP ADDRESS ||||
| ROUTER IP ADDRESS ||||
| CLIENT HARDWARE ADDRESS (16 OCTETS) ⋮ ||||
| SERVER HOST NAME (64 OCTETS) ⋮ ||||
| BOOT FILE NAME (128 OCTETS) ⋮ ||||
| OPTIONS (VARIABLE) ⋮ ||||

PROVIDING MOBILITY MANAGEMENT PROTOCOL INFORMATION TO A MOBILE TERMINAL FOR PERFORMING HANDOVER IN A MOBILE COMMUNICATION SYSTEM

CROSS-REFERENCE TO RELATED APPLICATIONS

Pursuant to 35 U.S.C. §119(a), this application claims the benefit of earlier filing date and right of priority to Korean Application No. P05-018856, filed on Mar. 7, 2005 and Korean Application No. P05-036426, filed on Apr. 29, 2005, the contents of which are hereby incorporated by reference herein in their entirety.

FIELD OF THE INVENTION

The present invention relates to a handover method for a mobile terminal of a mobile communication system, and more particularly to providing mobility management protocol information to a multi-mode mobile terminal for performing handover between heterogeneous networks.

BACKGROUND OF THE INVENTION

Currently, standards committee IEEE 802.21 conducts intensive research into the international standards associated with media independent handover (MIH) between heterogeneous networks. MIH provides not only a seamless handover but also a service continuity between the heterogeneous networks, resulting in greater convenience for a user who carries a mobile terminal. IEEE 802.21 defines a variety of functions (e.g., an MIH function, an event service, a command service, and an information service (IS) function) as basic requirements.

A mobile terminal (MSS) is indicative of a multi-mode node for supporting at least two interface types. For example, the multi-mode node can support a variety of interface types, such as a wired interface type (also called a wire-line interface type) such as the Ethernet based on an IEEE 802.3 standard specification, a wireless interface type based on IEEE 802.XX standard specifications (e.g., IEEE 802.11, IEEE 802.15, IEEE 802.16), and other interface types defined by a cellular standardization organization (e.g., 3GPP or 3GPP2).

A general Media Independent Handover Function (MIHF) reference model is depicted in FIG. 1. In the figure, MIHF architecture for interaction with other layers and with the remote MIHG is illustrated. In order for the MIHF to provide asynchronous and synchronous services to lower layers and higher layers, Service Access Points (SAPs) such as MIH_MGMT_SAP, MIH_SME_SAP and MIH_SAP along with primitives are defined. MIH_MGMT_SAP defines the interface between the MIHF and the management plane (Management Entity) of different network interfaces and is used for transporting MIH protocol messages between the MIHF and local link layer entities as well as peer MIHF entities.

MIH_SAP defines the interface between the MIHF and higher layer entities such as device manager, handover policy control function, transport, layer 3 (L3) mobility management protocol, etc., and is used for MIH configuration and operation. MIH_SME_SAP defines the interface between the MIHF and the Station Management Entity or the Network Management System, and is used for MIG configuration and operation.

FIG. 2 is a structural diagram illustrating a protocol layer of a multi-mode mobile terminal. Referring to FIG. 2, the protocol stack of the multi-mode mobile terminal includes a MAC structure including the IEEE802.11, the IEEE 802.16, and the 3G interface, and locates an MIH function under an Internet protocol (IP) layer. A variety of mobility management protocols are included in a network layer contained in the mobile terminal. The mobile terminal selects a mobility management protocol contained in the network layer according to a mobility management protocol type supported at a point of attachment (POA) to which the mobile terminal is connected, and establishes an IP connection.

The MIH function, an event service, a command service, and an Information Service (IS) will hereinafter be described.

Referring to FIG. 2, the multi-mode mobile terminal includes a physical (PHY) layer, or a first layer (L1), and a Medium Access Control (MAC) layer, or a second layer (L2), for individual modes, and locates the MIH layer under the IP layer. The MIH function located under the IP layer, i.e., the Media Independent Handover (MIH) must be defined between IEEE 802-series interfaces, or between an IEEE 802-series interface and a non-802-series interface (e.g., 3GPP or 3GPP2). The MIH function facilitates a handover process using input values (e.g., a trigger event and information associated with other networks) received from a second layer (Layer 2).

The MIH function may include a plurality of input values based on both user policy and configuration which may affect the handover process. General interfaces among the mobile IP, a third layer (L3) entity such as an SIP (Session Initiation Protocol), and the MIH layer are defined. In this case, the aforementioned interfaces provide the first layer (i.e., the physical layer), the second layer (i.e., the MAC layer), and mobility management information. The MIH function acquires information associated with a lower layer and a network using event and information service (IS) functions.

An upper layer includes an upper management entity for monitoring states and operations of various links contained in a mobile terminal, such that it performs a handover control function and a device manager function. In this case, the handover control function and the device manager may be located at different locations independent of each other, or the handover control function and the device manager may be included as the upper management entities in the upper layer.

FIG. 3 shows an MIH structure and a transmission protocol. In more detail, FIG. 3 shows a mobile terminal function entity including the MIH function, a network function entity, and a transmission protocol. Dotted lines of FIG. 3 are indicative of primitive information and an event trigger, etc.

In order to quickly perform a handover function, a network layer uses information generated from a link layer so that the network layer can quickly re-establish a connection state. The link layer event is adapted to predict the movement of a user, and helps a mobile terminal and a network prepare the handover function.

A trigger for the handover may be initiated from the physical (PHY) layer and the MAC layer. A source of the trigger may be determined to be a local stack or a remote stack. FIG. 4 is a block diagram illustrating a trigger model.

An event trigger provides state information of a current signal, state change information of another network, and future predicted change information. The event trigger further includes change information of the physical and MAC layers or attribute change information of a specific network.

The event types can be classified into a physical (PHY) layer event, a MAC layer event, a management event, a third layer (L3) event, and an application event, for example. There are a plurality of basic trigger events, such as a "Link_Up" event, a "Link_Down" event, a "Link_Going_Down" event, a "Link_Going_Up" event, a "Link_Event_Rollback" event, a "Link_Available" event, a "Link_Parameters_Change"

event, an "IP_Renewal_Indication" event, and an "IP_Renewal_Request" event, for example. The above-mentioned trigger events will hereinafter be described with reference to the following tables.

The following Table 1 shows parameters of the "Link_Up" event.

The "Link_Up" event occurs when a second layer (L2) connection is established on a specific link interface and an upper layer is able to transmit third layer (L3) packets. In this case, it is determined that all L2 layers contained in a link have been completely configured. A source of the "Link_Up" event corresponds to a "Local MAC" and a "Remote MAC".

TABLE 1

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacOldAccessRouter | MAC Address | MAC address of old access router |
| MacNewAccessRouter | MAC Address | MAC address of new access router |
| NetworkIdentifier | Media Specific | Network ID used for detecting subnet change |
| IP_Renewal_Indicator | | Presence or absence of IP temporary address change necessity 0: No change required 1: Change required |

The following Table 2 shows parameters of the "Link_Down" event.

The "Link_Down" event occurs when the L2 connection is released on a specific interface and L3 packets cannot be transmitted to a destination. The source of the "Link_Down" event is indicative of a local MAC.

TABLE 2

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacOldAccessRouter | MAC Address | MAC address of old access router |
| ReasonCode | | Reason for released link |

The following Table 3 shows parameters of the "Link_Going_Down" event.

The "Link_Going_Down" event occurs when it is expected that the L2 connection will enter a "Link_Down" state within a predetermined time, and may serve as a signal for initializing a handover procedure. A source of the "Link_Going_Down" corresponds to a "Local MAC" and a "Remote MAC".

TABLE 3

| Name | Type | Description |
| --- | --- | --- |
| EventSource | EVENT_LAYER_TYPE | Source at which event occurs |

TABLE 3-continued

| Name | Type | Description |
| --- | --- | --- |
| EventDestination | EVENT_LAYER_TYPE | Destination to which event is to be transmitted |
| MacMobileTerminal | MAC Address | MAC address of Mobile Terminal |
| MacOldAccessRouter | MAC Address | MAC address of old access router |
| MacNewAccessRouter | MAC Address | MAC address of new access router |
| TimeInterval | Time in msecs | Predicted Link_Down time of link |
| ConfidenceLevel | % | Link_Down level predicted at specific time |
| UniqueEventIdentifier | | Use in event rollback occurrence |

The following Table 4 shows parameters of the "Link_Going_Up" event.

The "Link_Going_Up" event occurs when it is expected that the L2 connection will enter a "Link_Up" state within a predetermined time, and is used when a long period of time is consumed to initialize a network. A source of the "Link_Going_Up" event corresponds to a "Local MAC" and a "Remote MAC".

TABLE 4

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacNewAccessRouter | MAC Address | MAC address of new access router |
| TimeInterval | Time in msecs | Predicted Link_UP time of link |
| ConfidenceLevel | % | Link_UP level predicted at specific time |
| UniqueEventIdentifier | | Use in event rollback occurrence |

The following Table 5 shows parameters of the "Link_Event_Rollback" event.

The "Link_Event_Rollback" event is formed by combining the "Link_Going_Down" event with the "Link_Going_Up" event. The "Link_Event_Rollback" event is indicative of a trigger generated when it is expected that the "Link_Up" event or "Link_Down" event will not be generated any more within a specific time on the condition that the "Link_Going_Up" event or "Link_Going_Down" event are transmitted to a destination. A source of the "Link_Event_Rollback" event corresponds to a "Local MAC" and a "Remote MAC".

TABLE 5

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |

TABLE 5-continued

| Name | Type | Description |
| --- | --- | --- |
| MacMobileTerminal | MAC Address | MAC address of Mobile Terminal |
| MacNewAccessRouter | MAC Address | MAC address of new access router |
| UniqueEventIdentifier | | Use in event rollback occurrence |

The following Table 6 shows parameters of the "Link_Available" event.

The Link_Available" event is indicative of an available state of a new specific link, and indicates the possibility of allowing a new base station (BS) or a new Point of Attachment (POA) to provide a link superior in quality as compared to a current BS or a current POA to which a current mobile terminal is connected. A source of the "Link_Available" event corresponds to a "Local MAC" and a "Remote MAC".

TABLE 6

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacNewAccessRouter | MAC Address | MAC address of new access router |
| MacOldAccessRouter | MAC Address | MAC address of old access router |
| IP_Renewal_Indicator | | Presence or absence of IP temporary address change necessity 0: No change required 1: Change required |

The following Table 7 shows parameters of the "Link_Parameter_Change" event.

The "Link_Parameter_Change" event is indicative of an event generated when a change of a link parameter value is higher than a specific threshold level. The "Link_Parameter_Change" event includes link layer parameters, for example, a link speed (i.e., a link rate), a QoS (Quality of Service), and an encrypted value, etc. A source of the "Link_Parameter_Change" event corresponds to a "Local MAC" and a "Remote MAC".

TABLE 7

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacAccessRouter | MAC Address | MAC address of new access router |
| oldValueOfLinkParameter | | Old value of link parameters |
| newValueOfLinkParameter | | New value of link parameters |

The following Table 8 shows parameters of the "IP_Renewal_Indication" event.

A new POA (e.g., a base station or POA) of the mobile terminal receives the "Link_Up" trigger signal, and triggers the "IP_Renewal_Indication" event to inform the mobile terminal of a changed or unchanged state of an IP address used for transmitting IP packets to the mobile terminal. The IP address is set to a newly-assigned IP address in the case of a dynamic host configuration protocol (DHCP) system, to a new temporary address (CoA) in the case of a mobile IPv4 system, and to an Autoconfiguration address in the case of a mobile IPv6 system. A source of the "IP_Renewal_Indication" event corresponds to a "Remote MAC" and an "MIH".

TABLE 8

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| IP_Renewal_Indicator | | Presence or absence of IP temporary address change necessity 0: No change required 1: Change required |
| MacMobileTerminal | MAC Address | MAC address of Mobile Terminal |
| Network ID | IP Address | Network address to which mobile terminal is connected in previous link |

The following Table 9 shows parameters of the "IP_Renewal_Request" event.

Upon receiving the "IP_Renewal_Indication" trigger signal indicative of an address re-establishment state, the MIH function of the mobile terminal transmits an "IP_Renewal_Request" signal to a network layer, such that it requests the network layer to re-establish an IP temporary address. A source of the "IP_Renewal_Request" event corresponds to a "Remote MAC" and an "MIH".

TABLE 9

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| Network ID | IP Address | Network address to which mobile terminal is connected in previous link |

FIG. 5 shows event triggers generated when a handover occurs. In more detail, FIG. 5 exemplarily shows triggers generated when a quality of a current access link is deteriorated. The triggers are generated until a new link is established.

A command service allows an upper layer to command a lower layer to perform a predetermined operation. For example, the upper layer transmits a specific command to the MIH function such that the MIH function performs a corresponding operation. The MIH function may also transmit a specific command to the lower layer such that the lower layer performs a corresponding operation. The above-mentioned commands are adapted to transmit a decision of the upper layer to the lower layer, and control the behavior or tasks of lower layer entities.

An information service provides detailed information associated with a network required for both network discovery and network selection, and is designed to be freely accessed by a user over any network. The information service includes a variety of information components, for example, a link access parameter, a security mechanism, a neighborhood map, a location, information indicative of a service provider and other access information, and a link cost (i.e., cost of link).

FIG. 6 is a flow chart illustrating a method for controlling a multi-mode mobile terminal to acquire network-associated information via an information server. As shown in FIG. 6, the multi-mode mobile terminal acquires various network-associated information via the information server, and performs a handover evaluation operation, a link selection operation and a handover procedure.

In more detail, the multi-mode mobile terminal receives an "Information Request/Response" message and a "Response List of Available Networks" message. The multi-mode terminal then acquires various network-associated information from an information server via a current point of attachment (POA) using the "Information Request/Response" message and the "Response List of Available Networks" message, such that the multi-mode terminal performs a handover evaluation operation and a link selection operation. If a new link is selected, the mobile terminal acquires information associated with a new network via the new point of attachment (POA) and an "MIH Resource Query/Response" message.

A variety of protocols (e.g., Mobile IPv4, DHCPv4, Mobile IPv6, and DHCPv6, etc.) for supporting the mobility of a mobile terminal will hereinafter be described.

FIG. 7 is a diagram illustrating operations of a mobile IPv4 system. The mobile IPv4 system requires a variety of functions (i.e., a mobile host function, a home agent function and a foreign agent function), such that it can provide the upper layer with clear mobility. However, if a path is not optimized, there is no need for a correspondent node communicating with the mobile terminal to be changed to another. In this case, the mobile host is indicative of an IP host at which the mobility is supported. The home agent maintains location information associated with the mobile host, and serves as a router for performing tunneling of the mobile host. The foreign agent is indicative of a router for supporting the mobility over a foreign network.

Operations of the mobile IPv4 system shown in FIG. 7 will hereinafter be described. Referring to FIG. 7, the mobile host moves from its home network to a foreign network at step S10. The mobile host then receives an advertisement message currently broadcast over the foreign network, such that mobile host recognizes that it has moved. Thereafter, the mobile host registers a temporary address or care of address (CoA) indicative of a current location of the mobile host with the home agent (HA) at step S20. In this case, the temporary address (CoA) may be equal to an IP address (i.e., foreign agent (FA)-CoA) of the foreign agent, or equal to a co-located CoA temporarily assigned to the mobile host via the DHCP in the foreign network.

Packets transmitted from an external part to the mobile host are transmitted to the home network. These packets are intercepted by the home agent at step S30, which recognizes the movement of the mobile terminal. The home agent having intercepted the above packets sets a destination address of the packets transmitted to the mobile host to an address of the foreign agent (FA) on the condition that the FA-CoA is used. The mobile host then encapsulates the destination address indicative of the FA address and transmits the encapsulated address at step S40. Thereafter, the encapsulated transmission packets are transmitted to the foreign agent (FA), wherein the foreign agent (FA) de-capsulates the received packets to recover original packets and transmits the original packets to the mobile host at step S50.

Packets transmitted from the mobile host to the correspondent node may be directly transmitted via the foreign agent (FA). If an ingress filtering problem occurs, the above-mentioned packets may also be transmitted via a reverse tunnel.

The principal functions required for the mobile IP are an agent discovery function, a registration function, and a routing function, etc., and their detailed description will hereinafter be described.

Agent discovery is indicative of a method for allowing a mobile terminal to determine whether the mobile terminal is connected to its own home network or a foreign network, such that the mobile terminal itself can recognize whether it has moved to another network.

The mobile IP extends a conventional ICMP (Internet Control Message Protocol) Router Discovery (i.e., IETF RFC 1256) to discover a desired agent. The agent advertisement message periodically broadcast by the agents (i.e., home agent and foreign agent) includes a "Mobility Agent Advertisement Extension" message in an "ICMP Router Advertisement" message, and transmits the "ICMP Router Advertisement" message including the "Mobility Agent Advertisement Extension" message. An "Agent Solicitation" message transmitted when the mobile terminal searches for an agent employs the same method as in a conventional "ICMP Router Solicitation" message.

When the mobile terminal moves to another network, a registration function transmits current location information to the home agent, and allows the mobile terminal to receive services from the home network without any change, in such a way that a highly adaptable mechanism is provided.

The mobile IP provides two registration procedures (i.e., FA-CoA and co-located CoA), such that it can establish a temporary address or care of address (CoA) when the mobile terminal moves to another subnet. If the mobile terminal uses the FA-CoA, it performs registration via the foreign agent (FA). If the mobile terminal uses the co-located CoA, the mobile terminal directly performs registration to the home agent. Also, if the FA-CoA is used, the CoA is supplied from a foreign agent via an agent advertisement message, and an IP address of the foreign agent (FA) is used as a temporary address (CoA). If the co-located CoA is used, the mobile terminal receives a temporary address (CoA) via a DHCP server located at the foreign network.

A routing function defines a variety of functions required for properly routing a datagram transmitted to/received from the mobile terminal when the mobile terminal is connected to or accesses a foreign network. The datagram includes a unicast packet, a multicast packet, and a broadcast packet.

A Dynamic Host Configuration Protocol (DHCP) is indicative of a protocol which allows network managers to centrally manage/allocate necessary IP addresses in a network contained in their organization. When computer users gain access to the Internet in an organization, an IP address must be assigned to individual computers. When the network manager centrally manages/allocates the IP address, and a computer is connected to the Internet at points outside the network, the DHCP automatically transmits a new IP address to the computer.

The DHCP employs a rental (or lease) scheme for controlling a given IP address. According to the scheme, the given IP address is valid at a corresponding computer only during a predetermined period of time. A lease time may be changed according to an Internet access time required by a user at a specific location. The DHCP reduces the IP address lease time when many more computers than available IP addresses are used, such that the DHCP can dynamically reconstruct a network.

In order to correctly operate the DHCP, at least one DHCP server and a single DHCP client is included in a corresponding network. Also, the network must further include not only the scope of a TCP/IP address (e.g., 203.224.29.10~203.224.29.100) but also a gateway address and a subnet mask.

The DHCP client acquires TCP/IP address information from the DHCP server while in operation. However, it should be noted that the acquired TCP/IP address is not permanent. The DHCP server provides a client with a lease address which may periodically expire or be periodically updated.

The DHCP client acquires/maintains the lease address via a plurality of handshake steps, each of which is referred to as a state. There are a plurality of client DHCP states, i.e., an initialization state (INT), a selecting state (SELECTING), a requesting state (REQUESTING), a binding state (BOUND), a renewing state (RENEWING), and a re-binding state (RE-BINDING), etc.

FIG. 8 shows a DHCP message format. FIG. 9 is a flow chart illustrating operations of a DHCP client-server model, and shows a method for allowing the DHCP client to automatically receive an IP address from the DHCP server.

The following Table 10 shows various types and usages of the DHCP messages shown in FIG. 9.

TABLE 10

| Message | Use |
| --- | --- |
| DHCPDISCOVER | Client broadcast to locate available servers. |
| DHCPOFFER | Server to client in response to DHCPDISCOVER with offer of configuration parameters. |
| DHCPREQUEST | Client message to servers either (a) requesting offered parameters from one server and implicitly declining offers from all others, (b) confirming correctness of previously allocated address after, e.g., system reboot, or (c) extending the lease on a particular network address. |
| DHCPACK | Server to client with configuration parameters, including committed network address. |
| DHCPNAK | Server to client indicating client's notion of network address is incorrect (e.g., client has moved to new subnet) or client's lease as expired |
| DHCPDECLINE | Client to server indicating network address is already in use. |
| DHCPRELEASE | Client to server relinquishing network address and canceling remaining lease. |
| DHCPINFORM | Client to server, asking only for local configuration parameters; client already has externally configured network address. |

FIG. 9 is a diagram illustrating operations of a DHCPv4 system. Referring to FIG. 9, the DHCPv6 system is indicative of a DHCP protocol for the IPv4 system. Specifically, a method for controlling the DHCP client to automatically receive an IP address from the DHCP server will hereinafter be described with reference to FIG. 9 and Table 10. First, the client broadcasts a "DHCPDISCOVER" message at step S110. If individual servers receive the "DHCPDISCOVER" message from the client, they answer the received "DHCPDISCOVER" message and transmit a "DHCPOFFER" message as a response signal at step S120.

The client having broadcast the "DHCPDISCOVER" message receives the "DHCPOFFER" message from one or more servers, and selects one of the servers to request a configuration parameter. Thereafter, the client broadcasts a "DHCPREQUEST" message at step S130. In this case, servers not selected by the "DHCPREQUEST" message recognize that the client has declined their respective offers. The server selected by the "DHCPREQUEST" message includes address configuration information in a "DHCPACK" message, and transmits the "DHCPACK" message with the address configuration information as a response signal at step S140.

If the client receives the "DHCPACK" message from the selected server, it constructs an address at step S150. However, if the client receives a "DHCPNAK" message, the client re-starts the aforementioned process. The client may also transmit a "DHCPRELEASE" message to the server when returning a leased address at step S160.

FIG. 10 is a flow chart illustrating operations of a mobile IPv6 system. The mobile IPv6 system can more effectively support mobility of a mobile terminal than the mobile IPv4 system, and has superior extensibility. The principal components for the mobile IPv6 system operations and functions of individual principal components will hereinafter be described with reference to FIG. 10.

Referring to FIG. 10, a mobile node (MN) is a host or router switching its network access. A correspondent node (CN) is a host or router communicating with the mobile node (MN). A home agent (HA) acts as a router, and contains registration information of the mobile node (MN) obtained from other routers contained in a home network such that the HA can transmit a datagram to a current position of the mobile node (MN) contained in a foreign network. A temporary address or care of address (CoA) is indicative of an IP address connected to the mobile node when the mobile node moves to a foreign node.

A term "Binding" is indicative of a specific operation in which the mobile node matches the CoA registered in the home agent with a home address of a corresponding node. A "Binding Update (BU)" message is indicative of a message used when the mobile node itself informs the home agent (HA) and the correspondent node (CN) of a CoA of the mobile node. A "Binding Acknowledge (BACK)" message is indicative of a response message to the aforementioned "BU" message. A "Binding Request (BR)" message is indicative of a message for requesting the "BU" message when the correspondent node (CN) does not receive the "BU" message until a timer for the binding information of the mobile node expires.

A term "CoA acquisition" is indicative of a specific operation in which the mobile node automatically constructs its location information while in motion using a neighbor discovery function and an address auto-configuration function. A term "Router Optimization" is indicative of a specific procedure during which the correspondent node (CN) directly communicates with the mobile node without passing though the home agent after storing the binding information.

The above-mentioned address auto-configuration function is classified into two address auto-configuration methods. For example, a first method is a state-maintenance-type address auto-configuration method for acquiring an address using a server, such as the DHCP server. A second method is a non-state-type address auto-configuration method, wherein the mobile node controls a host to generate an address by itself.

The state-maintenance-type address auto-configuration method is adapted to assign one of a plurality of addresses capable of being assigned from the server to the host on the condition that the host requests an address from the DHCP server. The non-state-type address auto-configuration method combines the mobile node's interface ID information with prefix information acquired from the router, such that the mobile node forms an address.

Operations of the mobile IPv6 system shown in FIG. 10 will hereinafter be described. Referring to FIG. 10, if the mobile node (MN) moves from a subnet A to another subnet B at step S200, the mobile node (MN) recognizes that it has moved to another subnet B using prefix information of a Router Advertisement (RA) message and a Neighbor Unreachable Detection (NUD) mechanism at step S210.

The mobile node (MN) itself then acquires a temporary address or care of address (CoA) using the aforementioned address auto-configuration method at step S220. Thereafter, the mobile node (MN) transmits the "BU" message, such that the home agent recognizes the acquired CoA at step S230.

The home agent (HA) having received the "BU" message combines (or binds) the home address of the mobile node (MN) with a temporary address (CoA), and transmits a "BACK" message as a response signal to the "BU" message at S240.

The correspondent node (CN) firstly communicating with the mobile node (MN) does not recognize that the mobile node (MN) has moved to another subnet. Accordingly, the CN sets a destination address to a home address of the mobile node (MN), and transmits the resultant packet to the home agent (HA) at step S250. The home agent (HA) for managing the mobile node (MN) intercepts the packet of the correspondent node (CN), and performs tunneling of the packet to a current location of the mobile node (MN) at step S260.

If the mobile node (MN) receives the tunneled packet, it determines that the correspondent node (CN) having transmitted the packet does not have the binding information, and transmits the "BU" message to the correspondent node (CN), such that it informs the correspondent node (CN) of a CoA of the mobile node (MN) at step S270. The correspondent node (CN) having received the CoA of the mobile node (MN) stores the binding information, and directly communicates with the mobile node (MN) using the binding information at step S280.

FIG. 11 is a flow chart illustrating operations of a DHCPv6 system. Referring to FIG. 11, the DHCPv6 system is indicative of a DHCP protocol for the IPv6, and supports the state-maintenance-type address auto-configuration method. The DHCPv6 system is indicative of a specific mechanism by which an IP address, various information (e.g., routing information), and a network resource management function are concentrated on a small number of DHCP servers, resulting in reduction of maintenance costs.

The DHCPv6 employs two multicast addresses, such as an "All_DHCP_Relay_Agents_and_Servers" address and an "All_DHCP_Servers" address. The "All_DHCP_Relay_Agents_and_Servers" address is indicative of a link local multicast address, which is used by a client to allow the client to communicate with an agent contained in a link on the condition that a link local address of the agent is unknown. All servers and agents act as components of the above multicast group.

The "All_DHCP_Servers" address is indicative of a site local multicast address, which is used by a client or a relay when the client or the relay transmits a message to all servers or does not recognize unicast addresses of the servers, such that the client or the relay can communicate with a server. In order to allow the client to use the above-mentioned "All_DHCP_Servers" address, the client must have addresses of sufficient ranges at which the server arrives. All servers contained in a site act as components of the above-mentioned multicast group.

A variety of messages can be used for basic operations of the DHCPv6 system, such as a "SOLICIT" message, an "ADVERTISE" message, a "REQUEST" message, a "REPLY" message, a "RENEW" message, and a "RELEASE" message, for example.

The "SOLICIT" message is adapted for the client to recognize location information of the server, and is multitasked using the "All_DHCP_Servers" address. The "ADVERTISE" message is indicative of a response message to the "SOLICIT" message. If possible, the DHCP server answers the "SOLICIT" message.

The "REQUEST" message is adapted to acquire constituent parameters equipped with an IP address from the server selected by the client, and is multitasked using the "All_DHCP_Relay_Agents_and_Servers" address. The "REPLY" message is indicative of a response message to the aforementioned "REQUEST", "RENEW", and "RELEASE" messages.

The "RENEW" message is indicative of a message required when the client acquires an initially-allocated client address and the lifetime of the constituent parameters. The "RELEASE" message is indicative of a message required when the client returns at least one IP address to the server.

Operations of the DHCPv6 system shown in FIG. 11 will hereinafter be described. Referring to FIG. 11, the client transmits the "SOLICIT" message to the "All_DHCP_Servers" address to recognize location information of the server at step S310. Individual DHCPv6 servers then output the "ADVERTISE" message to answer the "SOLICIT" message at step S320. In this case, the "ADVERTISE" message includes prefix information.

Thereafter, the client selects one of the DHCPv6 servers, transmits the "REQUEST" message to the selected server, and at the same time requests an additional constituent parameter at step S330. The selected DHCPv6 server outputs the "REPLY" message to answer the "REQUEST" message at step S340.

The client having received the "REPLY" message transmits the "RENEW" message to the DHCPv6 server, such that it updates conventional constituent parameters and the lifetime of allocated addresses, and starts operation of a T1 timer at step S350. In this case, the reference symbol "T1" is indicative of a specific time during which the client accesses the server having acquired an old address to increase the lifetime of a current address.

The DHCPv6 server transmits then the "REPLY" message as a response signal to the "RENEW" message at step S360. Thereafter, the client outputs the "RELEASE" message when an allocated address is no longer used, such that a corresponding address is released at step S370.

FIG. 12 is a flow chart illustrating an IP address setup procedure. In more detail, the IP address setup procedure indicates operations conducted when the multi-mode mobile terminal is handed over to a new network, and a mobility management protocol of the new network is different from that of an old network.

Referring to FIG. 12, the old network supports the mobility management protocol of the mobile IPv4 system. The new network supports the mobility management protocol of the mobile IPv6 system. It is assumed that the multi-mode mobile terminal installs mobility management protocols of the mobile IPv4 system and the mobile IPv6 system into a stack.

If the multi-mode mobile terminal is handed over to a new network, it receives an "IP_Renewal_Indication" trigger signal, and performs a CoA re-establishment procedure. In more detail, the mobile terminal having used the mobile IPv4 as the mobility management protocol in an old network broadcasts the "Agent Solicitation" message to acquire a new CoA. However, the new network (to which the mobile terminal is currently handed over) provides the mobile IPv6 as the mobility management protocol, such that the "Agent Solicitation" message is discarded.

Accordingly, the mobile terminal does not receive an "Agent Advertisement" message in response to the "Agent Solicitation" message after a lifetime of the "Agent Solicitation" message expires. After reattempting to transmit the "Agent Solicitation" message several times, the mobile terminal determines that it cannot be further operated by the mobile IPv4, and performs a CoA setup procedure using the mobile IPv6 message.

As described above, provided that the multi-mode mobile terminal is handed over to a new interface network (i.e., a new network), and a mobility management protocol of an old network is different from that of the new network, the mobile terminal requires a very long period of time until it recognizes that it cannot be further operated by the mobility management protocol of the old network in the new network. Only then does the mobile terminal establish a CoA using a mobility management protocol of the new network. In other words, a lengthy time delay occurs prior to the mobile terminal determining that it cannot be operated by the old mobility management protocol of the old network in the new network and establishing a CoA using the new mobility management protocol.

Therefore, due to the above-mentioned problems, the mobile terminal for performing traffic transmission/reception in real time encounters a damaged packet and an extended service time.

SUMMARY OF THE INVENTION

The present invention is directed to providing mobility management protocol information to a multi-mode mobile terminal for performing handover between heterogeneous networks.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for providing mobility management protocol information to a mobile terminal, the method comprising establishing a unified interface to an upper layer of the mobile terminal for managing messages to and from at least one of a homogeneous network and a heterogeneous network, discovering an accessible link of the at least one of a homogeneous network and a heterogeneous network for performing handover, and informing the upper layer of the accessible link via the unified interface, wherein the step of informing the upper layer comprises providing the upper layer with mobility management protocol information of the at least one of a homogeneous network and a heterogeneous network prior to establishing a connection with the accessible link.

In one aspect of the invention, the method further comprises requesting a scan of the at least one of a homogeneous network and a heterogeneous network via the unified interface to determine the presence of the accessible link of the at least one of a homogeneous network and a heterogeneous network for performing the handover.

In another aspect of the invention, the method further comprises requesting information related to the accessible link of the at least one of a homogeneous network and a heterogeneous network from an information server operationally connected to the at least one of a homogeneous network and a heterogeneous network.

Preferably, the step of requesting information comprises requesting mobility management protocol information of the at least one of a homogeneous network and a heterogeneous network. Preferably, the unified interface is a media independent handover function (MIHF) entity. Preferably, the upper layer comprises an upper management entity for managing homogeneous and heterogeneous network links associated with the mobile terminal. Preferably, the upper layer comprises at least one mobility management protocol for managing a respective mobile terminal mobility method.

In accordance with another embodiment of the present invention, a method for providing mobility management protocol information to a mobile terminal comprises establishing a unified interface to an upper layer of the mobile terminal for managing messages to and from at least one of a homogeneous network and a heterogeneous network, establishing a connection with an accessible link of the at least one of a homogeneous network and a heterogeneous network for performing handover, and receiving in the upper layer information from the unified interface related to the established connection, wherein the step of receiving the information comprises receiving mobility management protocol information of the at least one of a homogeneous network and a heterogeneous network.

Preferably, the step of receiving the information comprises receiving in the upper layer a request from the unified interface for establishing a network address for the at least one of a homogeneous network and a heterogeneous network, wherein the network address is an Internet protocol (IP) address. Preferably, the unified interface is a media independent handover function (MIHF) entity. Preferably, the upper layer comprises an upper management entity for managing homogeneous and heterogeneous network links associated with the mobile terminal. Preferably, the upper layer comprises at least one mobility management protocol for managing a respective mobile terminal mobility method.

In one aspect of the invention, the step of receiving the information comprises providing the upper layer with mobility management protocol information to a specific mobility management protocol related to the information.

In another aspect of the invention, the method further comprises providing the upper layer with mobility management protocol information by providing the information to a specific mobility management protocol related to the information, and establishing the network address for the at least one of a homogeneous network and a heterogeneous network when the mobility management protocol information is provided to the specific mobility management protocol.

In a further aspect of the invention, the method further comprises establishing the network address for the at least one of a homogeneous network and a heterogeneous network.

In accordance with another embodiment of the present invention, a method for providing mobility management protocol information to a mobile terminal comprises establishing a unified interface to an upper layer of the mobile terminal for managing messages to and from at least one of a homogeneous network and a heterogeneous network, establishing a connection with an accessible link of the at least one of a homogeneous network and a heterogeneous network for performing handover, and informing the upper layer of the established connection with the accessible link via the unified interface, wherein the step of informing the upper layer comprises providing the upper layer with mobility management protocol information of the at least one of a homogeneous network and a heterogeneous network.

Preferably, the unified interface is a media independent handover function (MIHF) entity. Preferably, the upper layer comprises an upper management entity for managing homogeneous and heterogeneous network links associated with the mobile terminal. Preferably, the upper layer comprises at least one mobility management protocol for managing a respective mobile terminal mobility method. Preferably, the step of providing the upper layer with mobility management protocol information comprises providing the information to a specific mobility management protocol related to the information.

In accordance with another embodiment of the present invention, a method for providing mobility management protocol information to a mobile terminal comprises establishing a unified interface to an upper layer of the mobile terminal for managing messages to and from at least one of a homogeneous network and a heterogeneous network, establishing a connection with an accessible link of the at least one of a homogeneous network and a heterogeneous network for performing handover, and receiving in the upper layer a request from the unified interface for establishing a network address for the at least one of a homogeneous network and a heterogeneous network, wherein the step of receiving a request for establishing a network address comprises providing the upper layer with mobility management protocol information of the at least one of a homogeneous network and a heterogeneous network.

Preferably, the network address is an Internet protocol (IP) address. Preferably, the unified interface is a media independent handover function (MIHF) entity. Preferably, the upper layer comprises an upper management entity for managing homogeneous and heterogeneous network links associated with the mobile terminal. Preferably, the upper layer comprises at least one mobility management protocol for managing a respective mobile terminal mobility method.

In one aspect of the invention, the step of providing the upper layer with mobility management protocol information comprises providing the information to a specific mobility management protocol related to the information. Preferably, the method further comprises establishing the network address for the at least one of a homogeneous network and a heterogeneous network when the mobility management protocol information is provided to the specific mobility management protocol.

In another aspect of the invention, the method further comprises establishing the network address for the at least one of a homogeneous network and a heterogeneous network.

In accordance with another embodiment of the present invention, a mobile terminal for receiving mobility management protocol information comprises a unified interface to an upper layer of the mobile terminal for managing messages to and from at least one of a homogeneous network and a heterogeneous network, means for discovering an accessible link of the at least one of a homogeneous network and a heterogeneous network for performing handover, and means for informing the upper layer of the accessible link via the unified interface, wherein the means for informing the upper layer comprises means for providing the upper layer with mobility management protocol information of the at least one of a homogeneous network and a heterogeneous network prior to establishing a connection with the accessible link.

In accordance with another embodiment of the present invention, a mobile terminal for receiving mobility management protocol information comprises a unified interface to an upper layer of the mobile terminal for managing messages to and from at least one of a homogeneous network and a heterogeneous network, means for establishing a connection with an accessible link of the at least one of a homogeneous network and a heterogeneous network for performing handover, and means for receiving in the upper layer information from the unified interface related to the established connection, wherein the means for receiving the information comprises means for receiving mobility management protocol information of the at least one of a homogeneous network and a heterogeneous network.

In accordance with another embodiment of the present invention, a mobile terminal for receiving mobility management protocol information comprises a unified interface to an upper layer of the mobile terminal for managing messages to and from at least one of a homogeneous network and a heterogeneous network, means for establishing a connection with an accessible link of the at least one of a homogeneous network and a heterogeneous network for performing handover, and means for informing the upper layer of the established connection with the accessible link via the unified interface, wherein the means for informing the upper layer comprises means for providing the upper layer with mobility management protocol information of the at least one of a homogeneous network and a heterogeneous network.

In accordance with another embodiment of the present invention, a mobile terminal for receiving mobility management protocol information comprises a unified interface to an upper layer of the mobile terminal for managing messages to and from at least one of a homogeneous network and a heterogeneous network, means for establishing a connection with an accessible link of the at least one of a homogeneous network and a heterogeneous network for performing handover, and means for receiving in the upper layer a request from the unified interface for establishing a network address for the at least one of a homogeneous network and a heterogeneous network, wherein the means for receiving a request for establishing a network address comprises means for providing the upper layer with mobility management protocol information of the at least one of a homogeneous network and a heterogeneous network.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 8 is a structural diagram illustrating a Dynamic Host Configuration Protocol (DHCP) message.

DETAILED DESCRIPTION OF THE PREFERRED EMBODIMENTS

The present invention relates to providing mobility management protocol information to a multi-mode mobile terminal for performing handover between heterogeneous networks.

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that two methods are adapted to preferably provide a mobile terminal with mobility management protocol information supported by a new network. For example a first method provides the mobile terminal with mobility management protocol information via an event service, and a second method provides the mobile terminal with mobility management protocol information via an information service.

Figure 1:
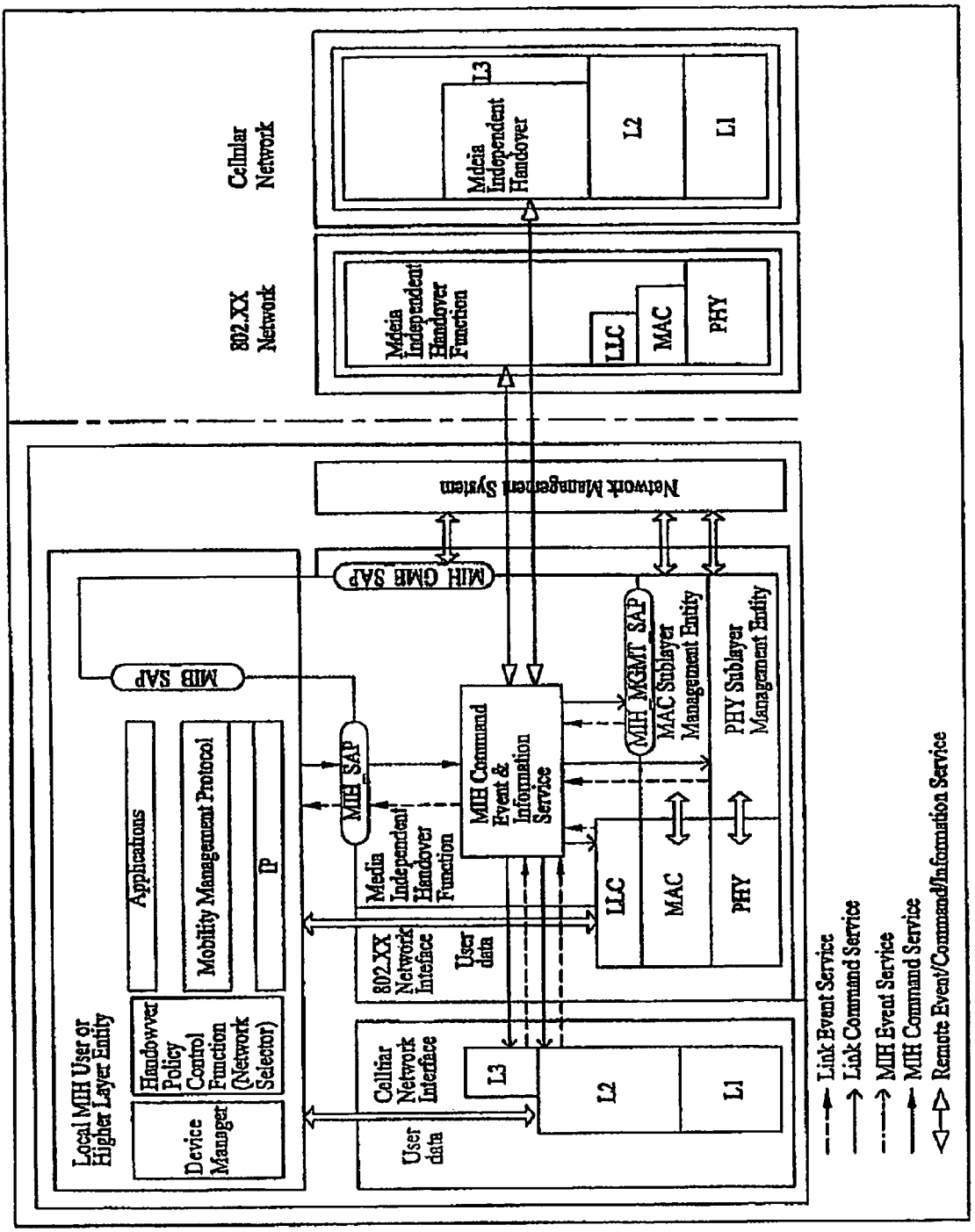
FIG. 1 illustrates a general media independent handover function (MIHF) reference model.
Figure 2:
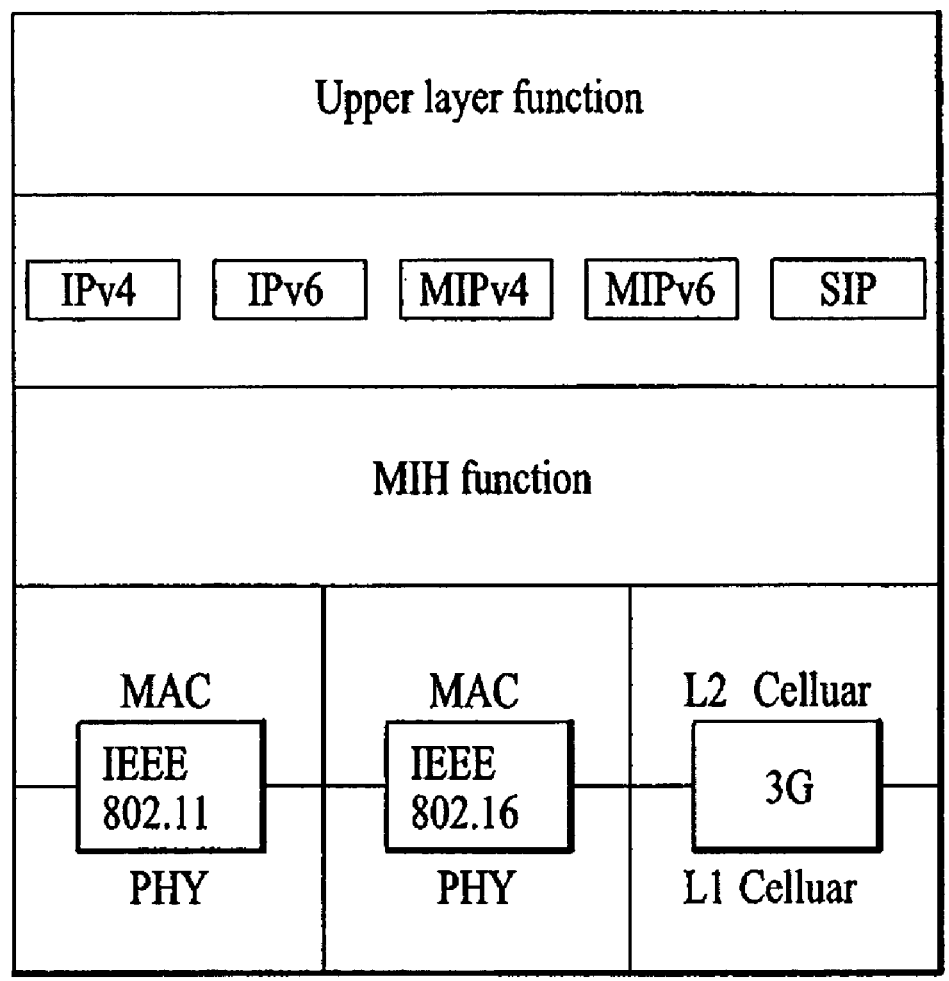
FIG. 2 is a structural diagram illustrating a protocol stack structure of a multi-mode mobile terminal.
Figure 3:
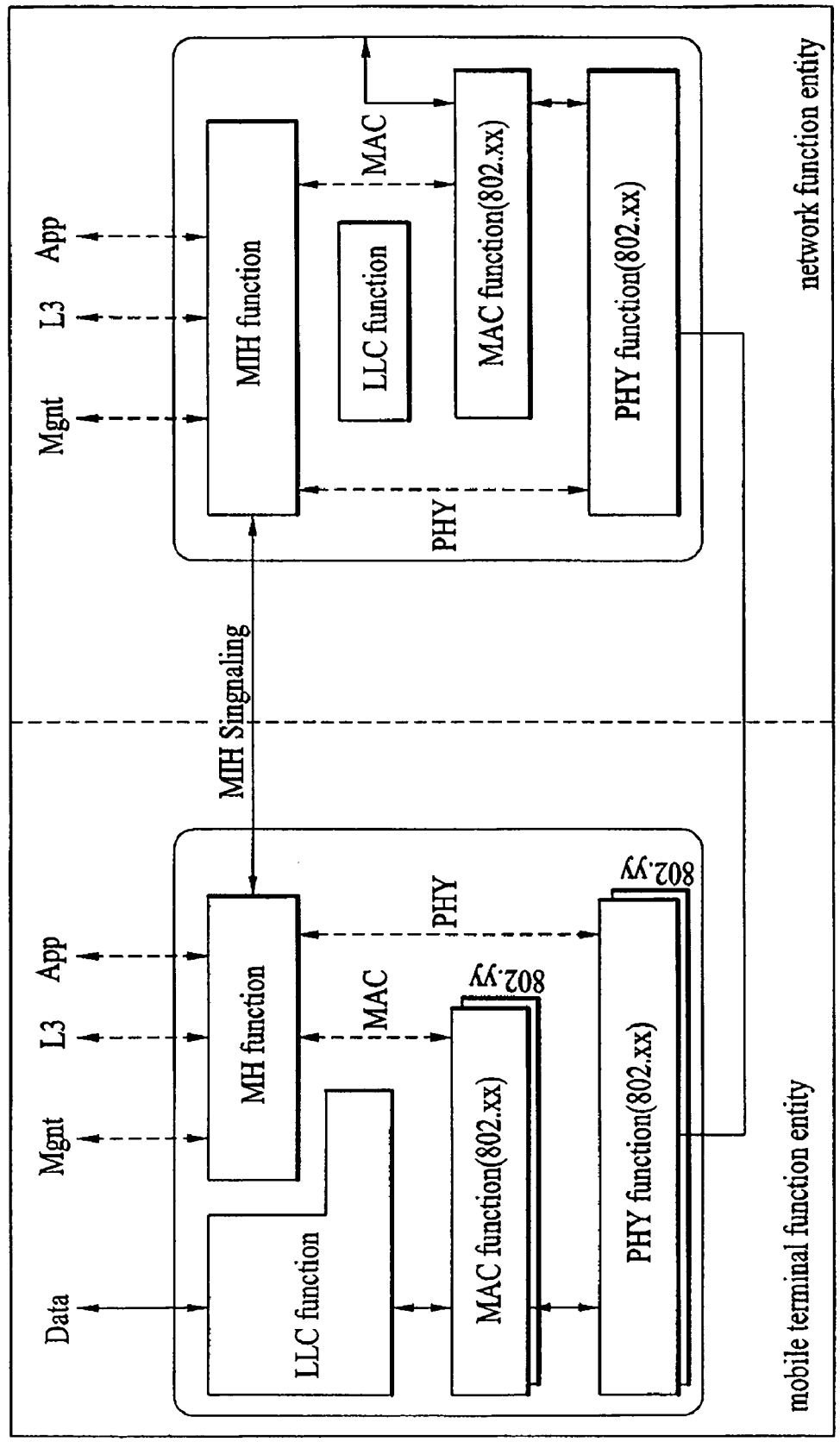
FIG. 3 is a block diagram illustrating a media independent handover (MIH) structure and a transmission protocol.
Figure 4:
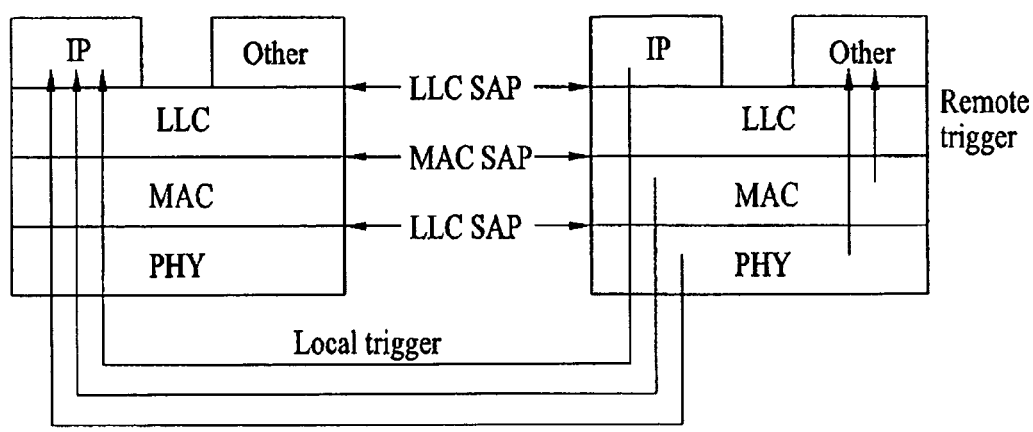
FIG. 4 is a structural diagram illustrating a trigger model.
Figure 5:
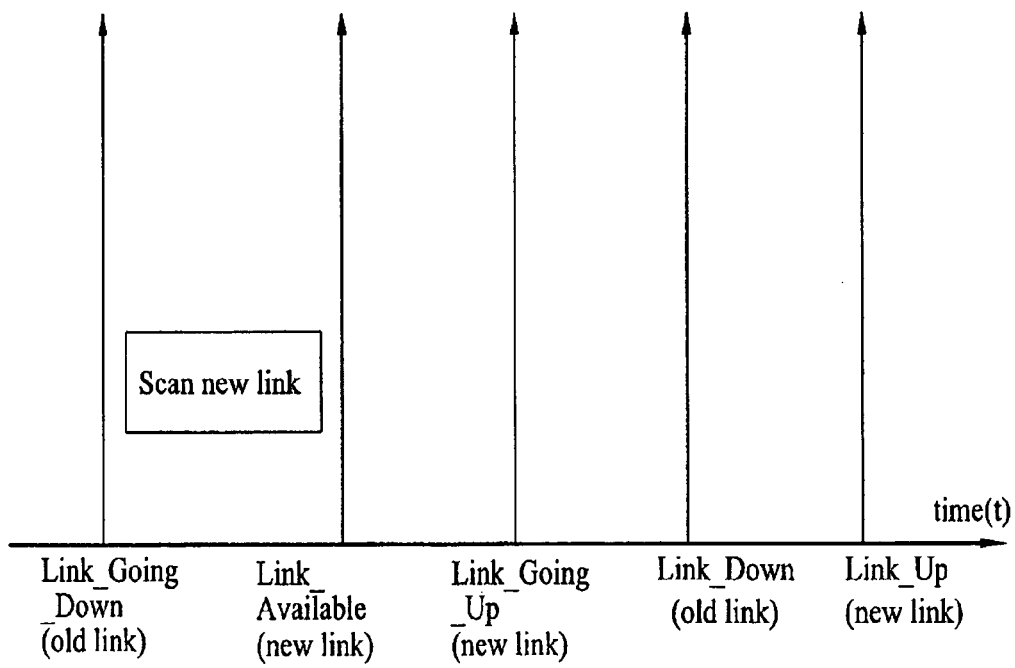
FIG. 5 illustrates event triggers generated when a handover operation occurs.
Figure 6:
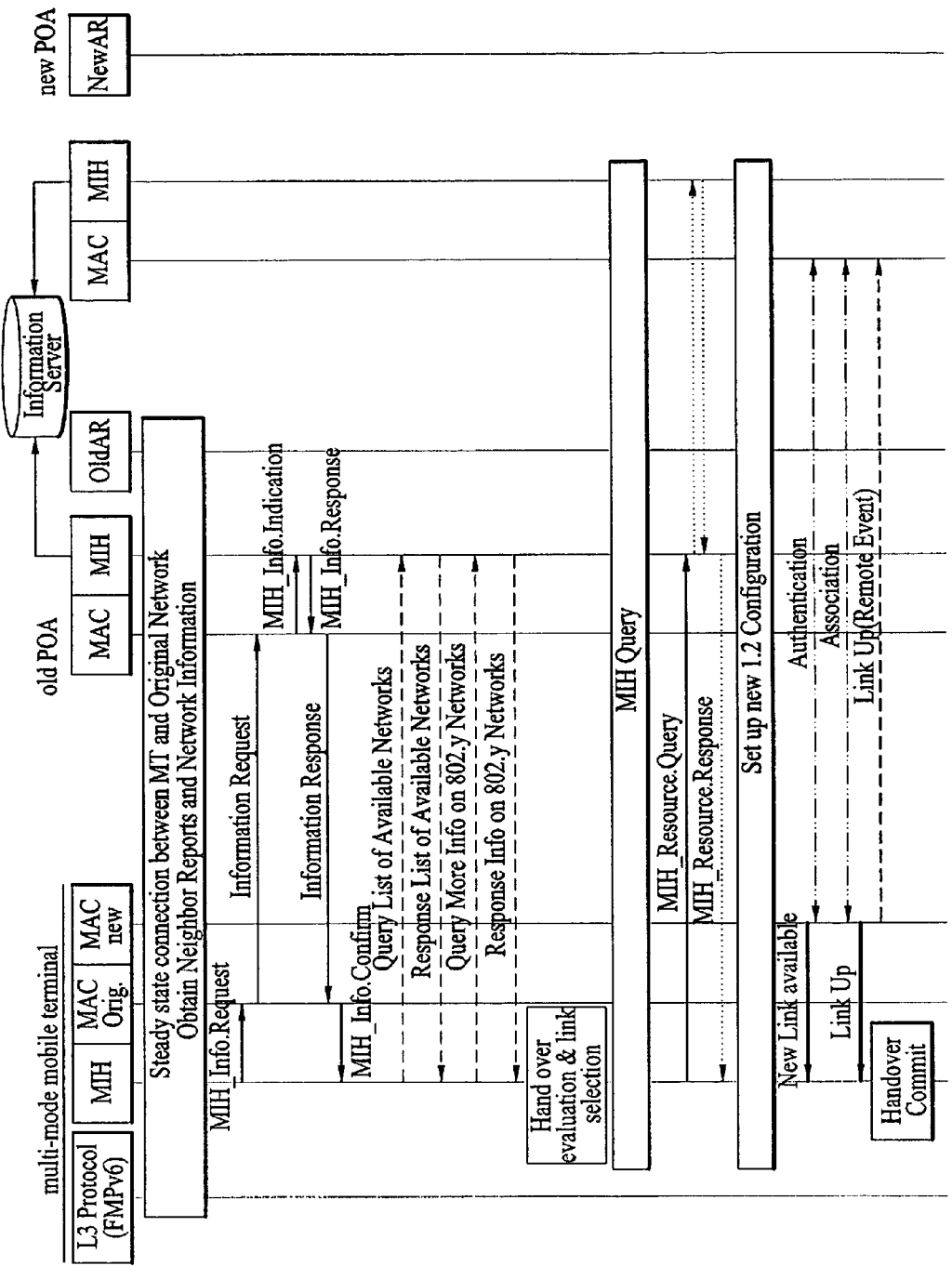
FIG. 6 is a flow chart illustrating a method for allowing a multi-mode mobile terminal to acquire network-associated information via an information server.
Figure 7:
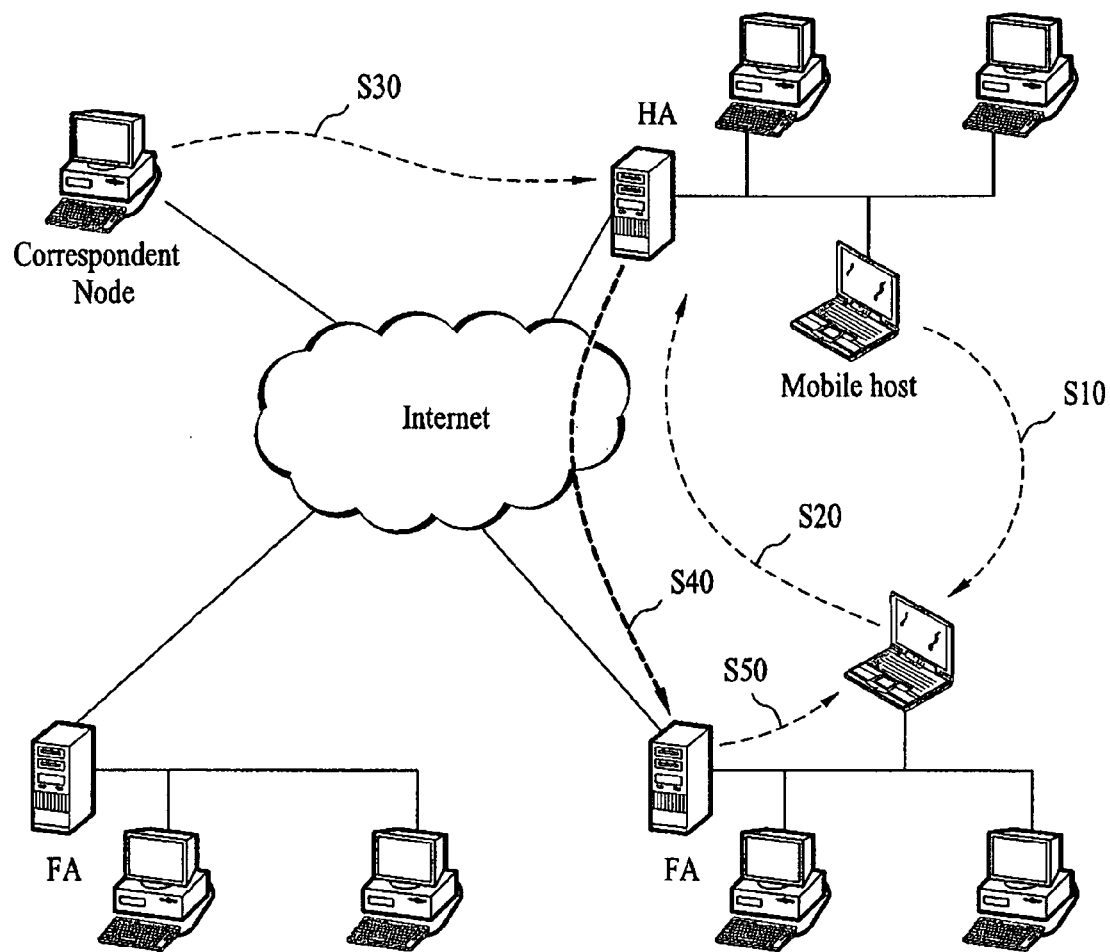
FIG. 7 is a diagram illustrating operations of a mobile IPv4 system.
Figure 9:
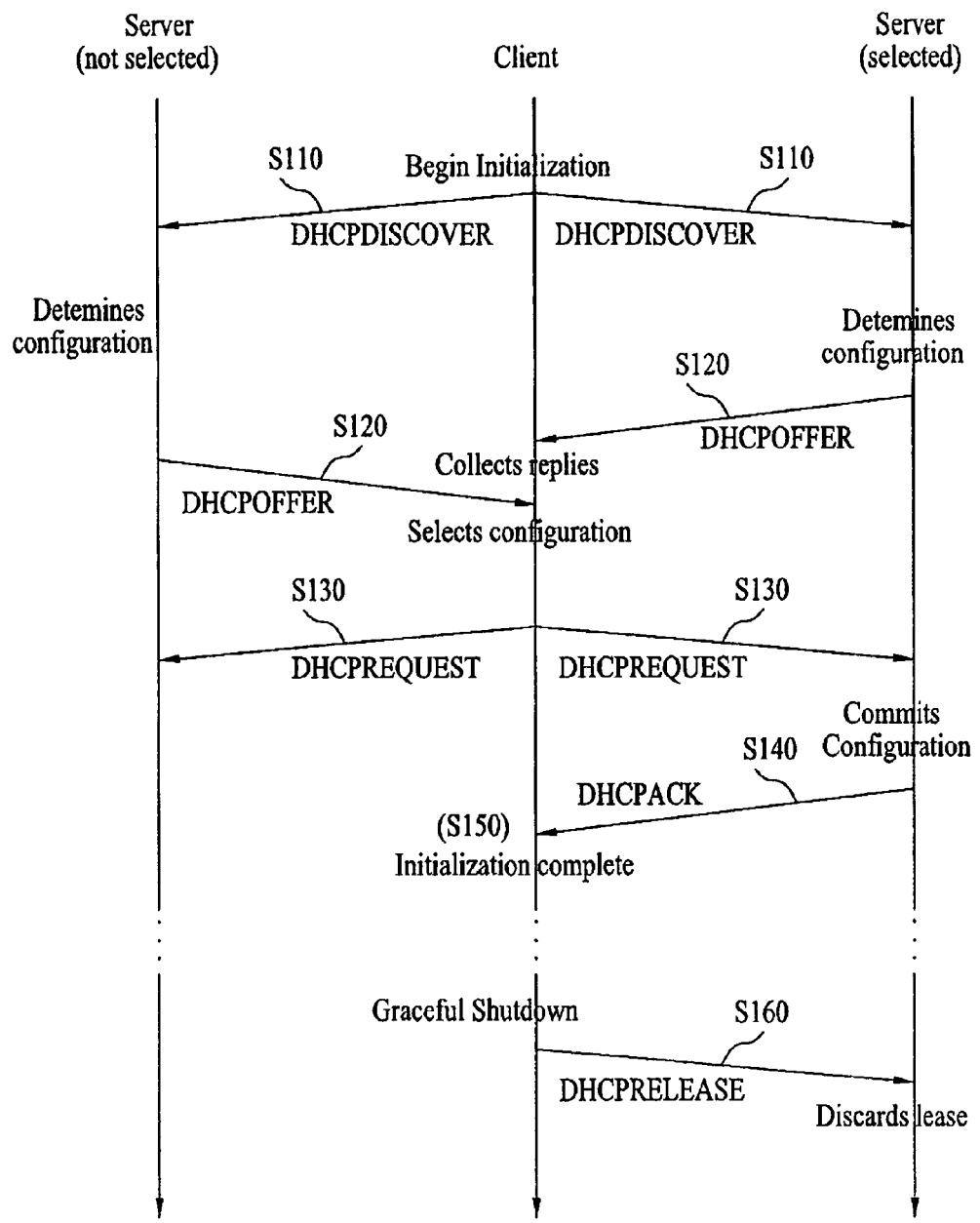
FIG. 9 is a flow chart illustrating operations of a DHCP client-server model.
Figure 10:
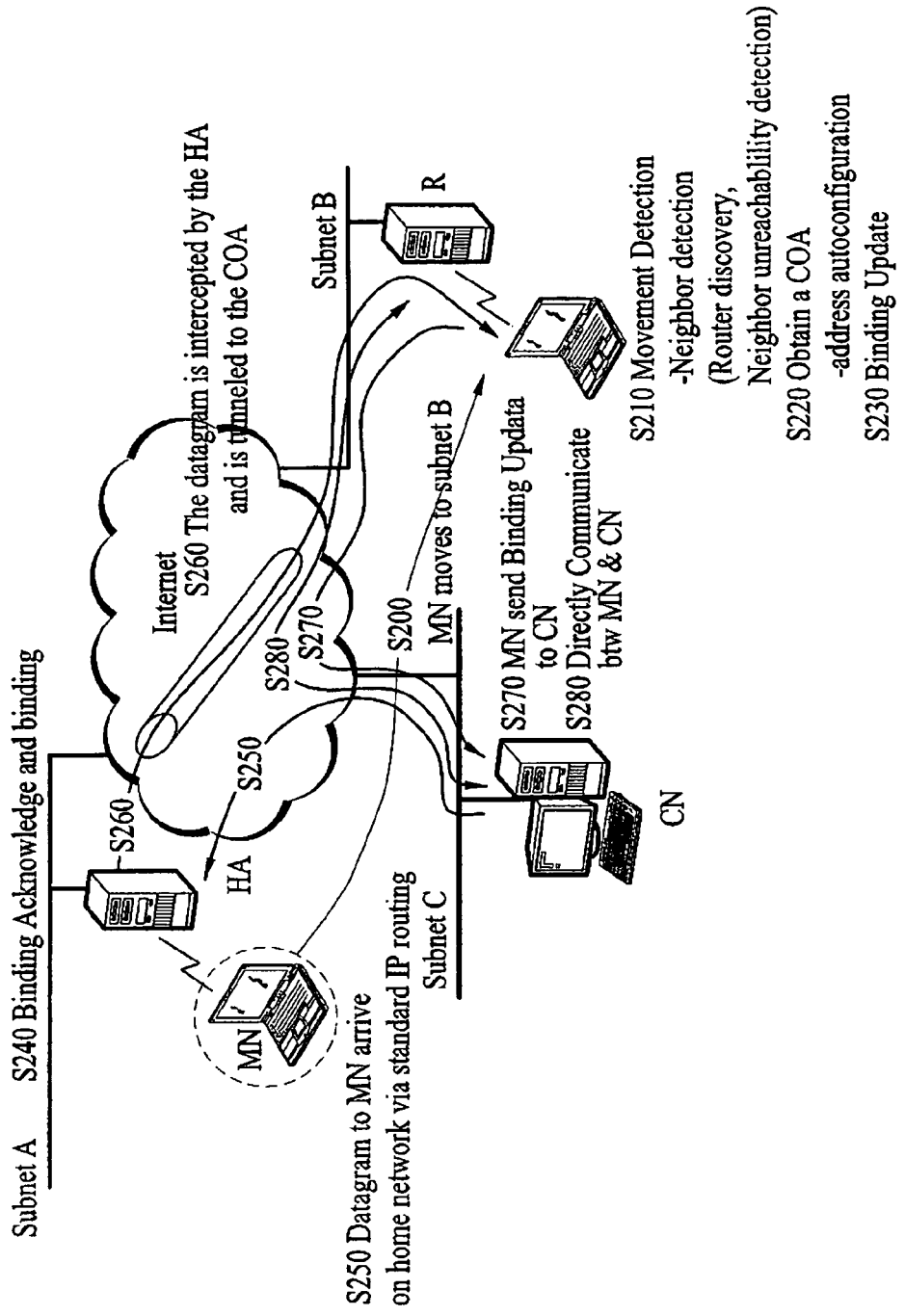
FIG. 10 is a flow chart illustrating operations of a mobile IPv6 system.
Figure 11:
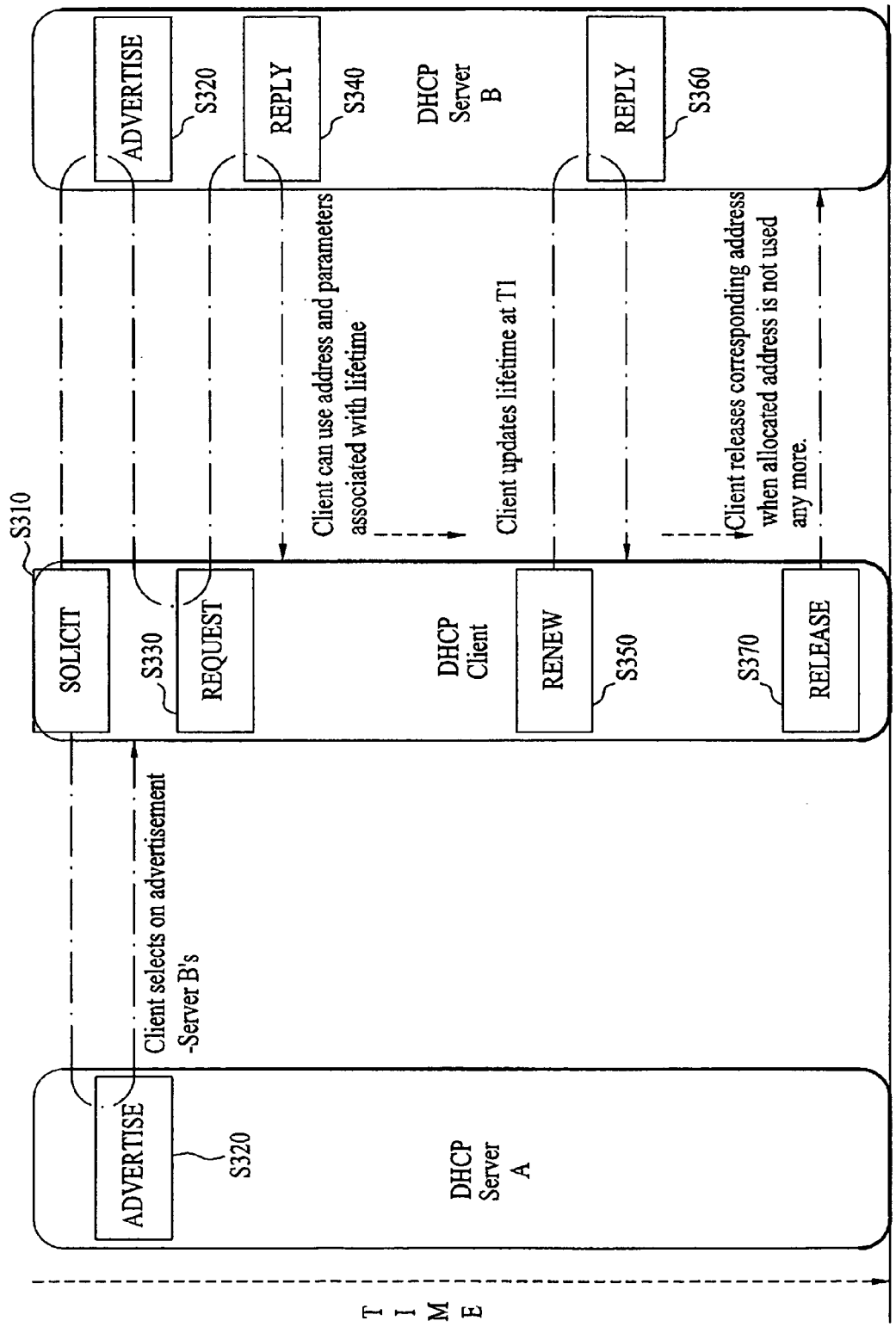
FIG. 11 is a flow chart illustrating operations of a DHCPv6 system.
Figure 12:
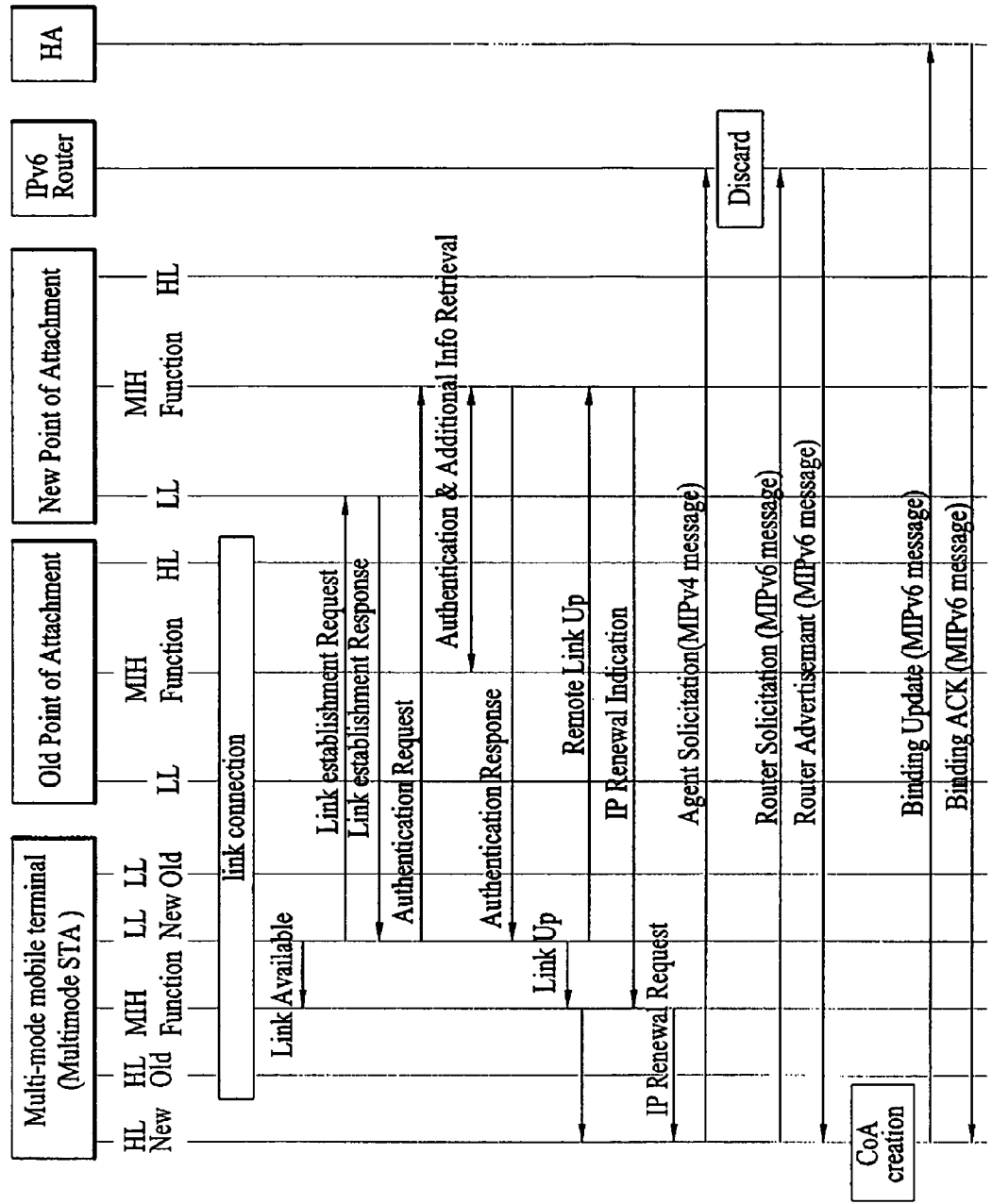
FIG. 12 is a flow chart illustrating an Internet protocol (IP) address setup procedure.
Figure 13:
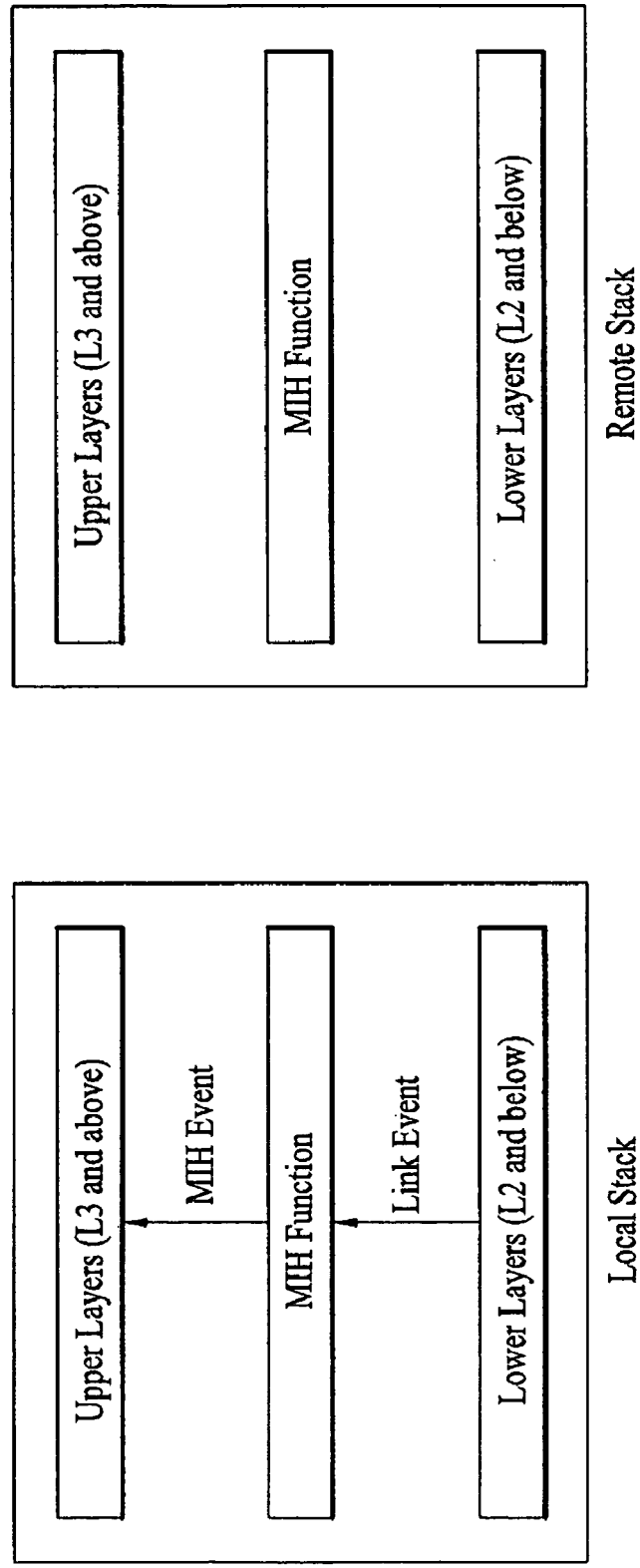
FIG. 13 is a structural diagram illustrating a "Link Event" model and an "MIH Event" model in accordance with one embodiment of the present invention.

FIG. 13 is a structural diagram illustrating a "Local Event" model and an "MIH Event" model in accordance with one embodiment of the present invention. Referring to FIG. 13, the MIH event is indicative of an event transmitted from the MIH to either the upper management entity or the upper layer, and corresponds to conventional event triggers. A link event is indicative of an event transmitted from a lower layer (i.e., a MAC layer or a physical (PHY) layer) to the MIH, and uses primitives for use in individual interface MAC or physical layers.

Figure 14:
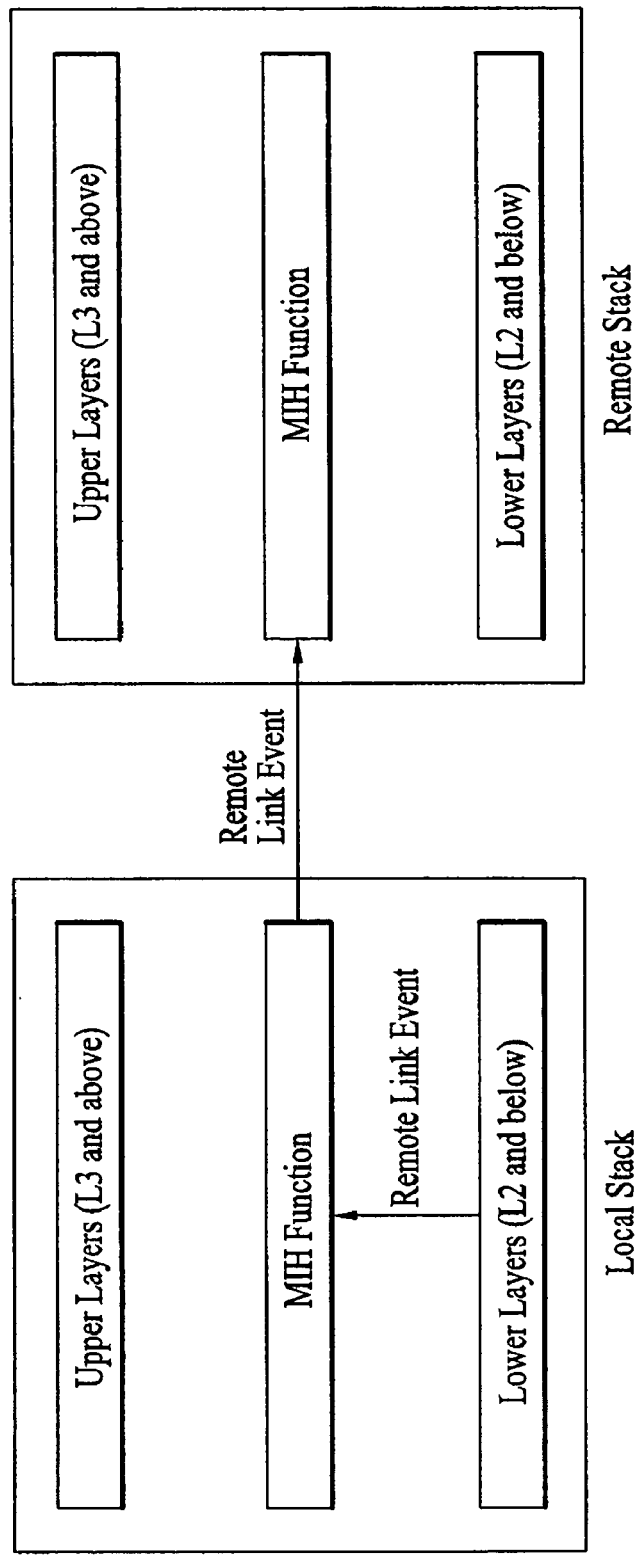
FIG. 14 is a structural diagram illustrating a "Remote Link Event" model in according with one embodiment of the present invention.

FIG. 14 is a structural diagram illustrating a "Remote Link Event" model in accordance with one embodiment of the present invention. Referring to FIG. 14, if a lower layer contained in a local stack generates an event and transmits the event to the MIH contained in a local stack, the MIH of the local stack transmits the aforementioned event to the MIH of a remote stack.

Figure 15:
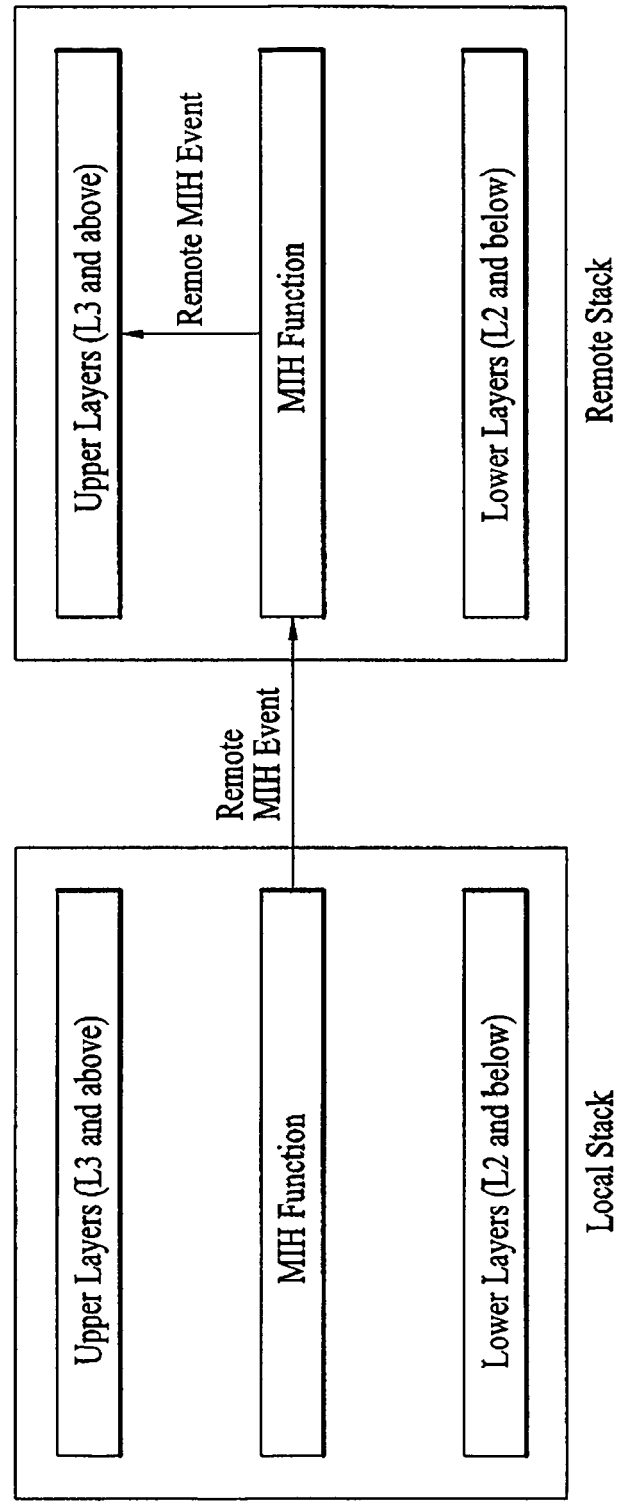
FIG. 15 is a structural diagram illustrating a "Remote MIH Event" model in accordance with one embodiment of the present invention.

FIG. 15 is a structural diagram illustrating a "Remote MIH Event" model in accordance with one embodiment of the present invention. Referring to FIG. 15, the MIH function of the local stack generates a remote MIH event, and transmits the remote MIH event to a correspondent MIH function contained in a remote stack. The correspondent MIH function transmits the received event to an upper management entity or an upper layer contained in a stack of the correspondent MIH function.

Figure 16:
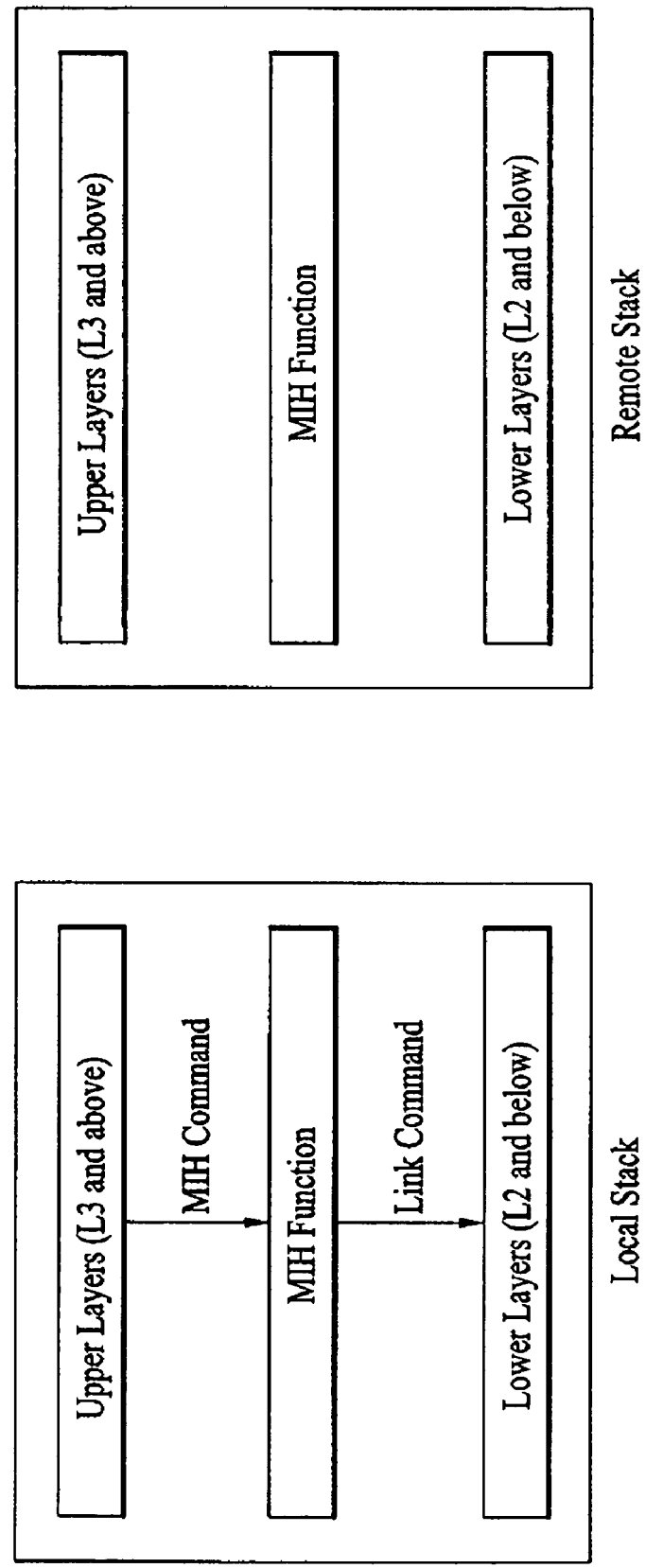
FIG. 16 is a structural diagram illustrating an "MIH command" model and a "Link command" model in accordance with one embodiment of the present invention.

FIG. 16 is a structural diagram illustrating an "MIH command" model and a "Link command" model in accordance with one embodiment of the present invention. Referring to FIG. 16, the MIH command is generated from the upper management entity or the upper layer, and is then transmitted to the MIH function, such that it commands the MIH to perform a specific task. The link command is generated from the MIH function, and is then transmitted to the lower layer, such that it commands the lower layer to perform a specific task.

Figure 17:
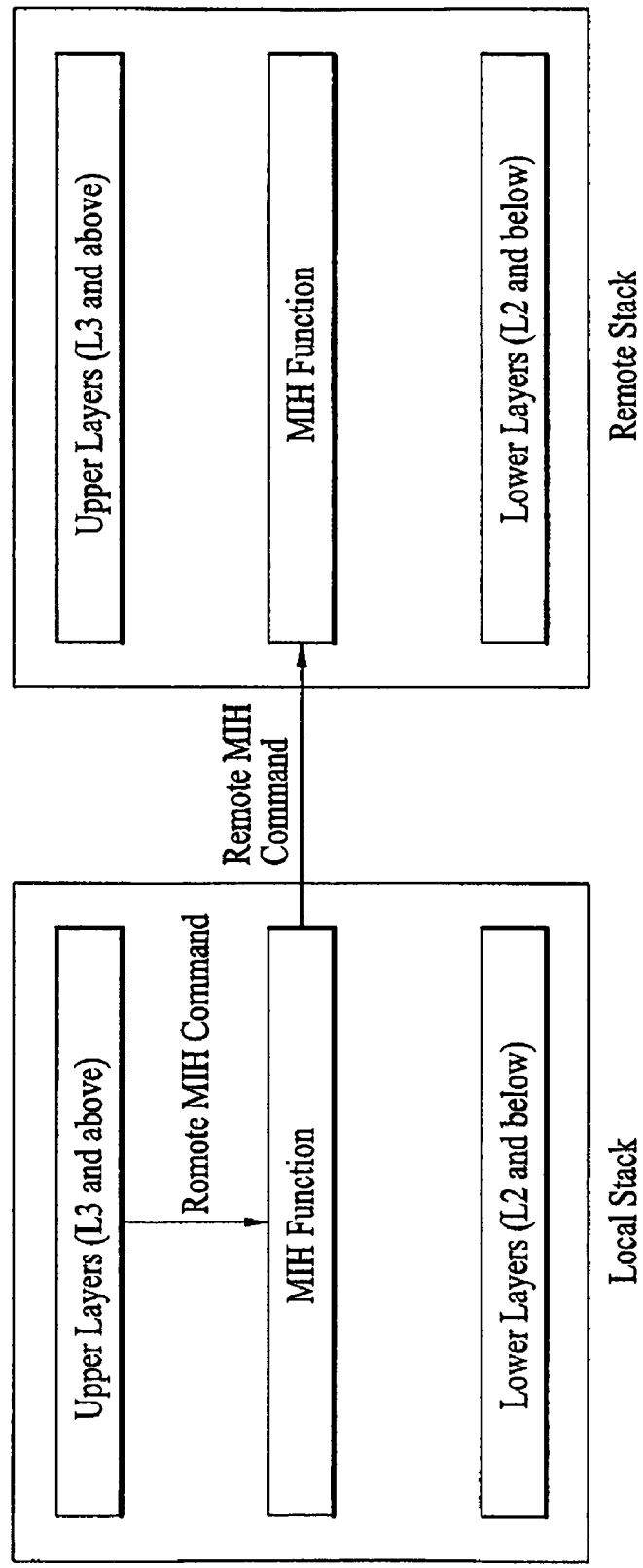
FIG. 17 is a structural diagram illustrating a "Remote MIH command" model in accordance with one embodiment of the present invention.

FIG. 17 is a structural diagram illustrating a "Remote MIH command" model in accordance with one embodiment of the present invention. Referring to FIG. 17, the remote MIH command is generated from the upper management entity or the upper layer, and is then transmitted to the MIH function. The MIH function transmits the received MIH command to a correspondent MIH function contained in a remote stack.

Figure 18:
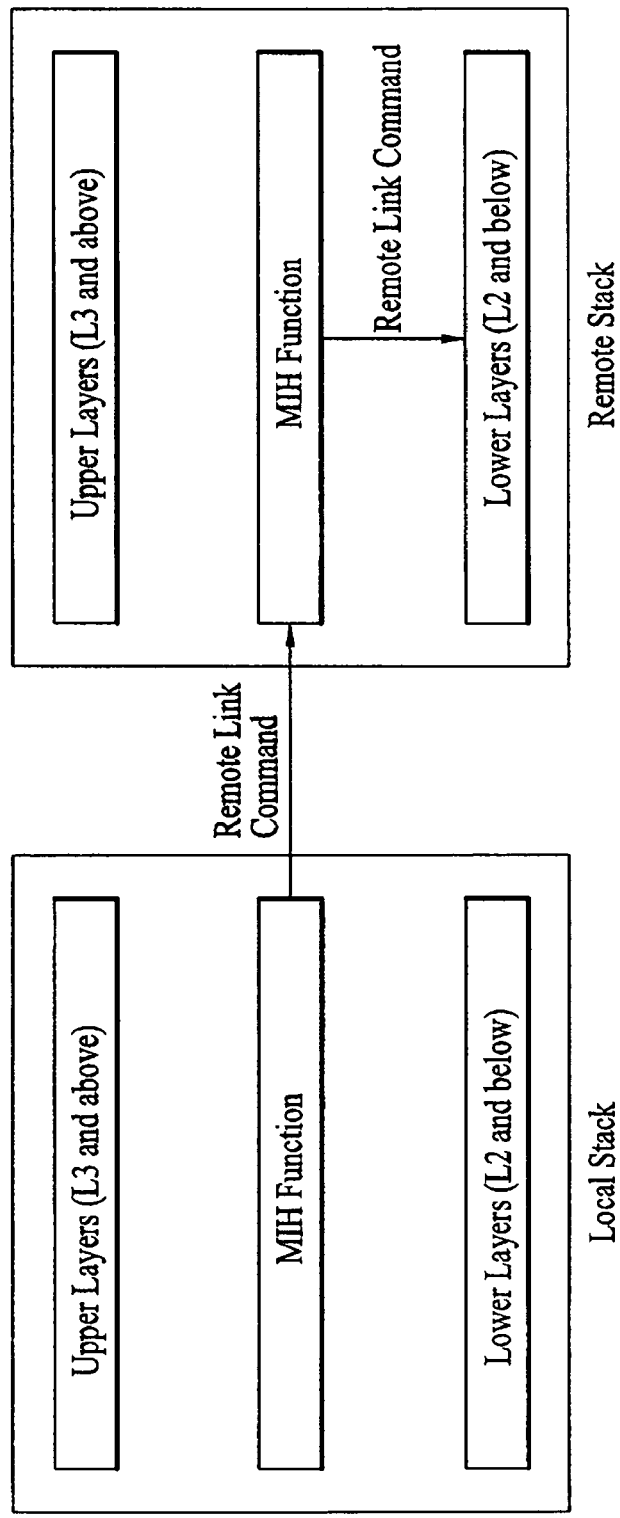
FIG. 18 is a structural diagram illustrating a "Remote Link Command" model in accordance with one embodiment of the present invention.

FIG. 18 is a structural diagram illustrating a "Remote Link Command" model in accordance with one embodiment of the present invention. Referring to FIG. 18, the MIH function contained in the local stack generates a remote link command, and transmits the remote link command to a correspondent MIH function contained in a remote stack. The correspondent MIH function transmits the remote link command to the lower layer contained in the remote stack.

Figure 19:
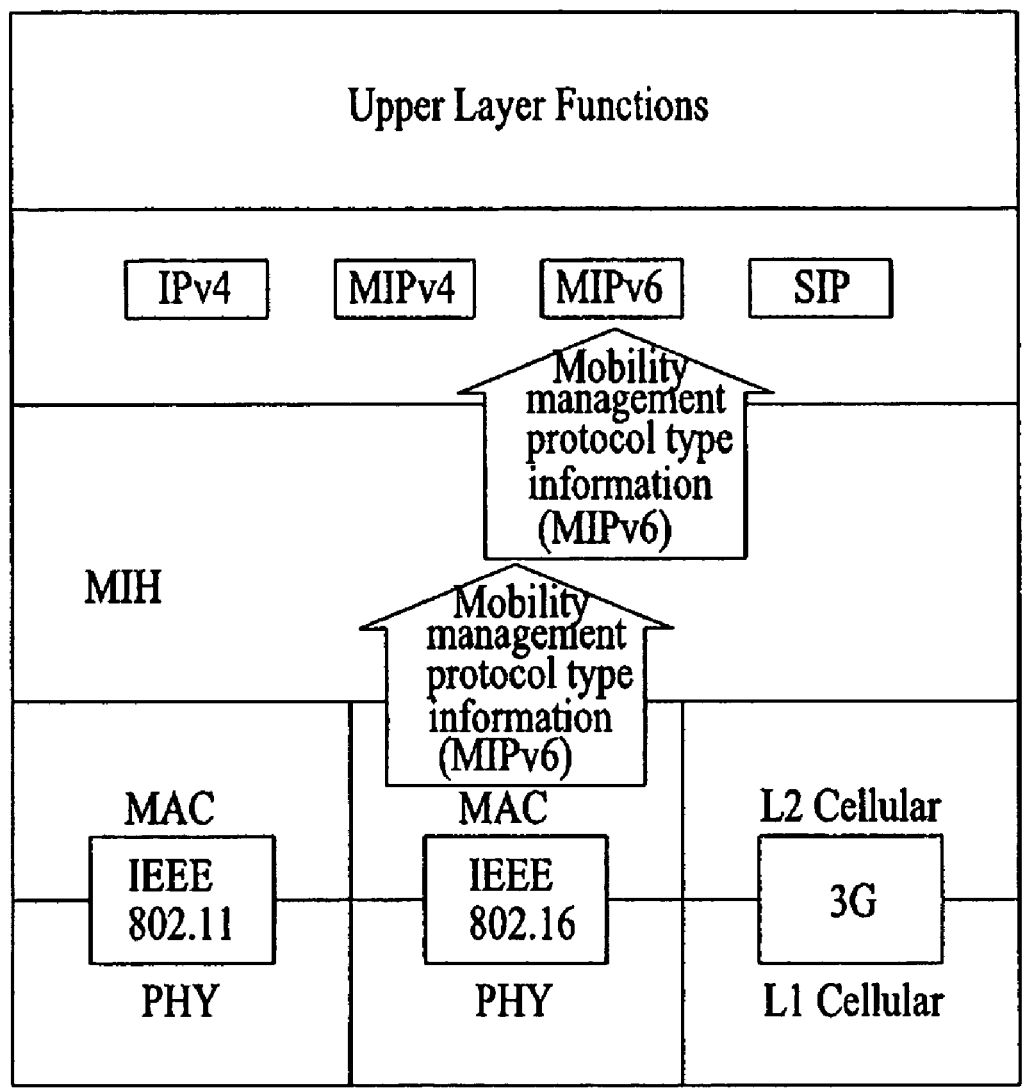
FIG. 19 is a structural diagram illustrating a protocol stack structure in accordance with one embodiment of the present invention.

The following preferred embodiments of the present invention relate to a method for providing a mobile terminal with mobility management protocol information via an event service. FIG. 19 is a structural diagram illustrating a protocol stack structure in accordance with one embodiment of the present invention. As shown in FIG. 19, if a multi-mode mobile terminal is handed over from an IEEE 802.11 network (i.e., an old network) supporting a mobile IPv4 as a mobility management protocol, to an IEEE 802.16 network (i.e., a new network) supporting an MIPv6 as a mobility management protocol, a method for transmitting mobility management protocol information supported by the IEEE 802.16 network (i.e., the new network) uses the inventive event service of the present invention using a protocol stack structure.

If a mobile terminal acting as a multi-mode mobile terminal is handed over to a new network, the Medium Access Control (MAC) layer of the mobile terminal includes mobility management protocol type information supported by the new network in an MIH event (e.g., "Link_Available" or "Link_Up") and transmits the MIH event equipped with the mobility management protocol type information to an MIH function (also called an MIH layer). The MIH function then transmits a "Link_Up" event to a corresponding mobility management protocol (i.e., MIPv6).

The method for providing the mobile terminal with the mobility management protocol information via an event service adds new parameters to the "Link_Up", "Link_Available" or "IP_Renewal_Indication" event in order to provide the mobile terminal with new mobility management protocol information supported by a new network. Accordingly, the mobile terminal recognizes a mobility management protocol supported by a new network via the aforementioned newly-added parameters. The aforementioned parameters include information associated with a current mobility management protocol. However, if a new mobility management protocol is to be developed in the future, information associated with the newly developed mobility management protocol may also be added to the aforementioned parameters as necessary.

A newly-added parameter, such as a mobility management protocol support type bitmap is indicative of various mobility management protocol types capable of being supported by the new network. For example, a bit of "1" indicates that a corresponding mobility management protocol can be supplied from a network.

Figure 20:
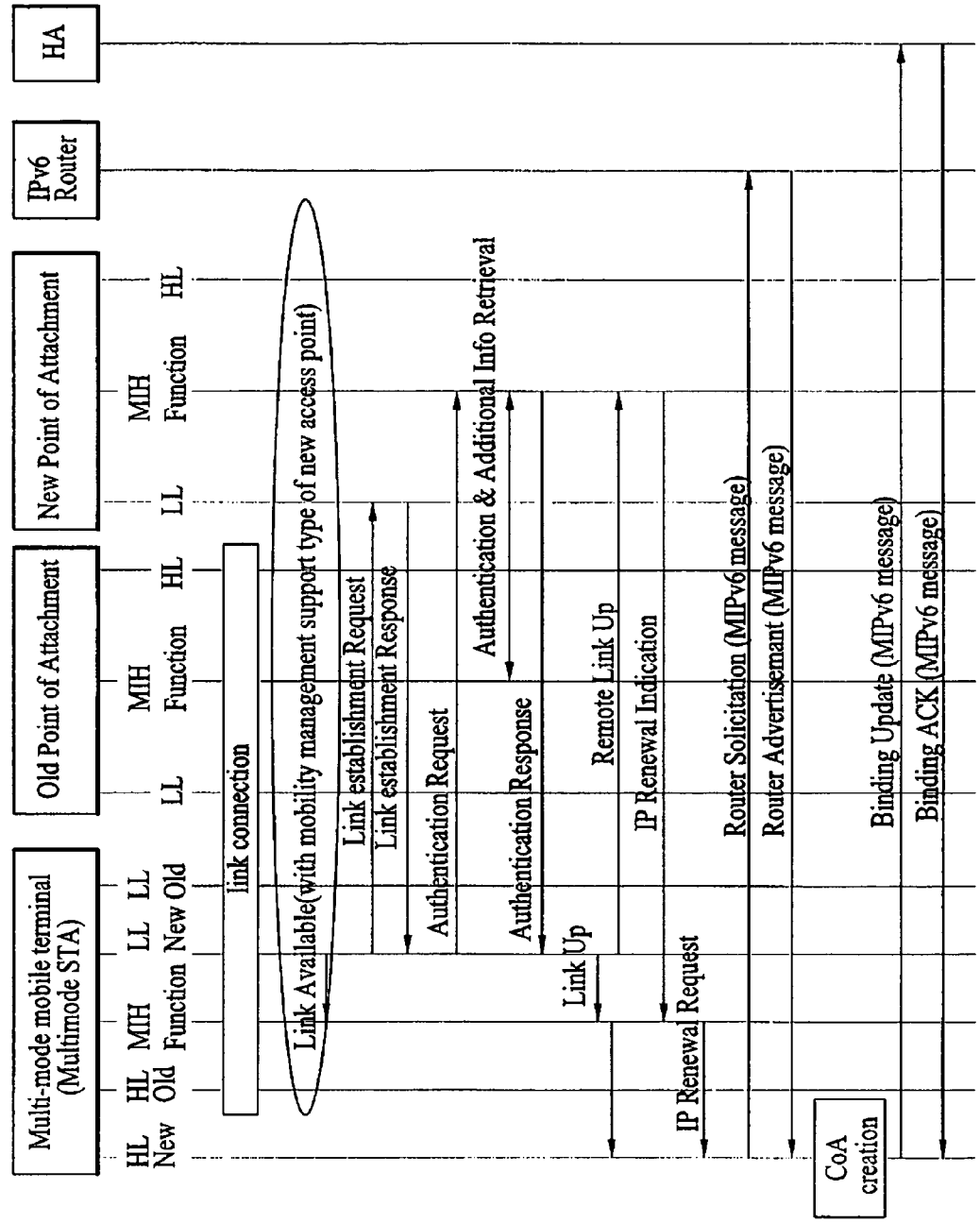
FIG. 20 is a flow chart illustrating an IP address setup procedure in accordance with one embodiment of the present invention.

FIG. 20 is a flow chart illustrating an IP address setup procedure in accordance with one embodiment of the present invention. Preferably, a method for allowing the mobile terminal to receive new mobility management protocol information of a new network via a "Link_Available" event is shown. Referring to FIG. 20, if a mobile terminal equipped with a mobile IPv4 mobility management protocol and a mobile IPv6 mobility management protocol accesses a network supporting the mobile IPv4 mobility management protocol, and is then handed over to a new network supporting the mobile IPv6 mobility management protocol, a mobility management protocol support type bitmap of the present invention is contained in the "Link_Available" event. Accordingly, a mobility management protocol type supported by the new network is supplied to the mobile terminal before the mobile terminal establishes a connection state with the new network (i.e., new link).

Preferably, a new lower layer (LL new) or new MAC layer of the multi-mode mobile terminal acquires mobility management protocol information (e.g., mobile IPv6) of a new point of attachment (POA) using a scanning operation and other messages. The LL new then includes the acquired information in the "Link_Available" event and transmits the "Link_Available" event including the acquired information to the MIH layer.

Accordingly, if the MIH layer receives a "Link_Up" event indicating that the mobile terminal has established a connection setup with a corresponding link when the MIH layer temporarily maintains the mobility management protocol information associated with a corresponding point of attachment (POA), the MIH layer transmits a "Link_Up MIH" event to a corresponding mobility management protocol (i.e., mobile IPv6) by referring to the aforementioned maintained information. Thereafter, an upper layer or network layer of the mobile terminal performs an IPv6 Care of Address (CoA) setup procedure to acquire a new CoA, and registers the new CoA with a home agent.

The following table 11 exemplarily shows parameters of the "Link_Available" event including the mobility management protocol support type bitmap.

TABLE 11

| Name | Type | Description |
|---|---|---|
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacNewAccessRouter | MAC Address | MAC address of new access router |
| MacOldAccessRouter | MAC Address | MAC address of old access router |
| IP_Renewal_Indicator | | Presence or absence of IP temporary address change necessity<br>0: No change required<br>1: Change required |
| Mobility Management protocol support type bitmap | | 0: Mobile IPv4 with FA (FA-CoA)<br>1: Mobile IPv4 without FA (Co-located CoA)<br>2: Mobile IPv6<br>3: Mobile IPv6 with DHCPv6<br>4: SIP |

Figure 21:
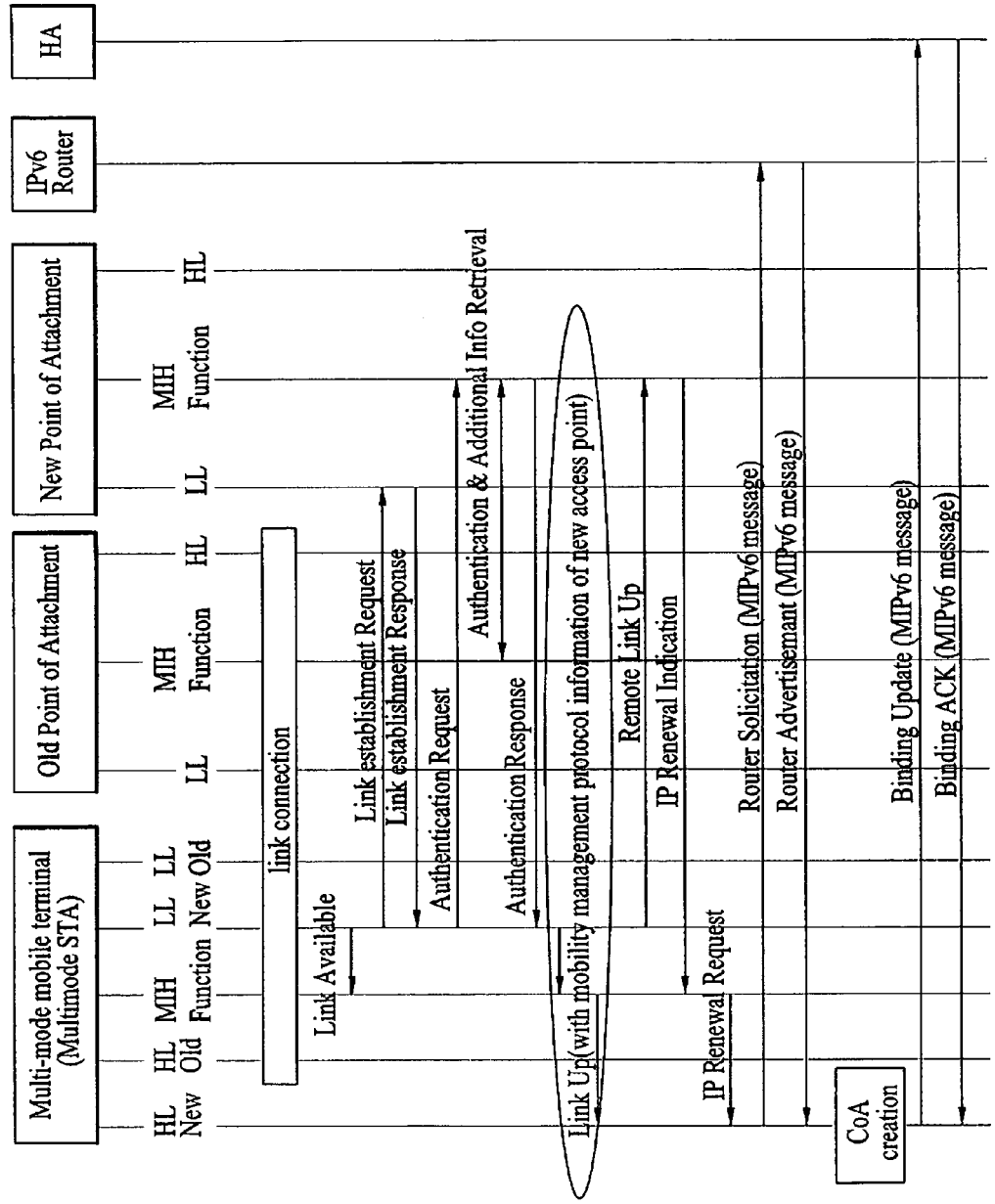
FIG. 21 is a flow chart illustrating an IP address setup procedure in accordance with one embodiment of the present invention.

FIG. 21 is a flow chart illustrating an IP address setup procedure in accordance with one embodiment of the present invention. Preferably, a method for allowing a mobile terminal to receive mobility management protocol information of a new network via the "Link_Up" event is shown in FIG. 21.

Preferably, as shown in FIG. 21, if a mobile terminal equipped with a mobile Ipv4 mobility management protocol and a mobile IPv6 mobility management protocol accesses a network capable of supporting the mobile IPv4 mobility management protocol, and is then handed over to a new network supporting the mobile IPv6 mobility management protocol, a mobility management protocol support type bitmap of the present invention is contained in the "Link_Up" event. Accordingly, a mobility management protocol type supported by the new network is supplied to the mobile terminal before a network layer handover procedure is executed.

Preferably, a new lower layer (LL New), such as a MAC layer, of the multi-mode mobile terminal establishes a connection state with a new link via a "Link establishment Request/Response" message, such that the LL New acquires mobility management protocol information (e.g., MIPv6) of a new point of attachment (POA). Thereafter, if the multi-mode mobile terminal establishes a connection state with the new link, a "Link_Up MIH" event including the mobility management protocol information is transmitted to the MIH layer. The MIH layer then transmits a corresponding event service to a corresponding mobility management protocol (MIPv6) by referring to the mobility management protocol support type bitmap of the trigger "Link_Up" event.

The following Table 12 exemplarily shows parameters of the "Link_Up" event including the mobility management protocol support type bitmap.

TABLE 12

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacNewAccessRouter | MAC Address | MAC address of new access router |
| MacOldAccessRouter | MAC Address | MAC address of old access router |
| NetworkIdentifier | Media Specific | Network ID used for detecting subnet change |
| IP_Renewal_Indicator | | Presence or absence of IP temporary address change necessity 0: No change required 1: Change required |
| Mobility Management protocol support type bitmap | | 0: Mobile IPv4 with FA (FA-CoA) 1: Mobile IPv4 without FA (Co-located CoA) 2: Mobile IPv6 3: Mobile IPv6 with DHCPv6 4: SIP |

Figure 22:
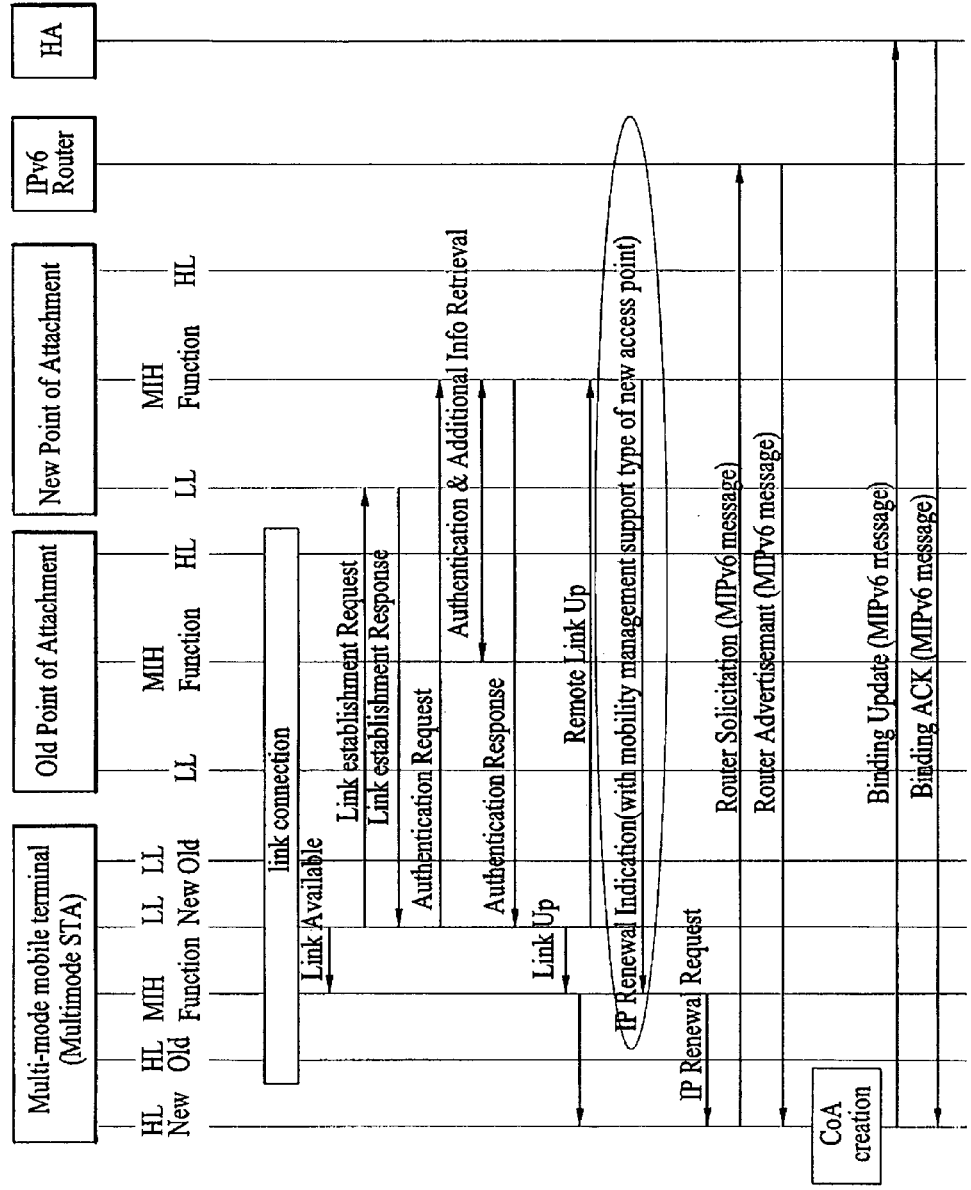
FIG. 22 is a flow chart illustrating an IP address setup procedure in accordance with one embodiment of the present invention.

FIG. 22 is a flow chart illustrating an IP address setup procedure in accordance with one embodiment of the present invention. Preferably, a method for allowing a mobile terminal to receive mobility management protocol information of a new network via the "IP_Renewal_Indication" event is shown in FIG. 22.

Preferably, as shown in FIG. 22, if a mobile terminal equipped with a mobile Ipv4 mobility management protocol and a mobile IPv6 mobility management protocol accesses a network capable of supporting the mobile IPv4 mobility management protocol, and is then handed over to a new network supporting the mobile IPv6 mobility management protocol, the mobility management protocol support type bitmap of the present invention is contained in the "IP_Renewal_Indication" event. Accordingly, a mobility management protocol type supported by the new network is supplied to the mobile terminal before the network layer handover procedure is executed.

Preferably, a new point of attachment (POA) of the mobile terminal receives a "Remote Link_Up MIH" event from the mobile terminal. The new POA then transmits an "IP_Renewal_Indication Link" event, including mobility management protocol information supplied from a network of the mobile terminal, to the MIH layer of the mobile terminal. The MIH layer of the mobile terminal then transmits an "IP_Renewal_Request" event to a corresponding mobility management protocol (MIPv6) by referring to the mobility management protocol support type bitmap of the "IP_Renewal_Indication Link" event.

The above-mentioned preferred embodiment shows an example in which the "IP_Renewal_Indication" trigger signal occurs after a link setup between the mobile terminal and the new point of attachment (POA) is completed. However, provided that the old point of attachment (POA) acquires IP address information of the new point of attachment (POA) using an inter-MIH signal message (i.e., a signal message between MIH functions), the old POA can provide the aforementioned "IP_Renewal_Indication" trigger signal before the mobile terminal establishes a link with the new POA.

The following Table 13 exemplarily shows parameters of the "IP_Renewal_Indication" event including the mobility management protocol support type bitmap.

TABLE 13

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| IP_Renewal_Indicator | | Presence or absence of IP temporary address change necessity 0: No change required 1: Change required IP |
| MacMobileTerminal | MAC Address | MAC address of Mobile Terminal |
| Network ID | IP Address | Network address to which mobile terminal is connected in previous link |
| Mobility Management Protocol Support Type bitmap | | 0: Mobile IPv4 with FA (FA-CoA) 1: Mobile IPv4 without FA (Co-located CoA) 2: Mobile IPv6 3: Mobile IPv6 with DHCPv6 4: SIP |

Figure 23:
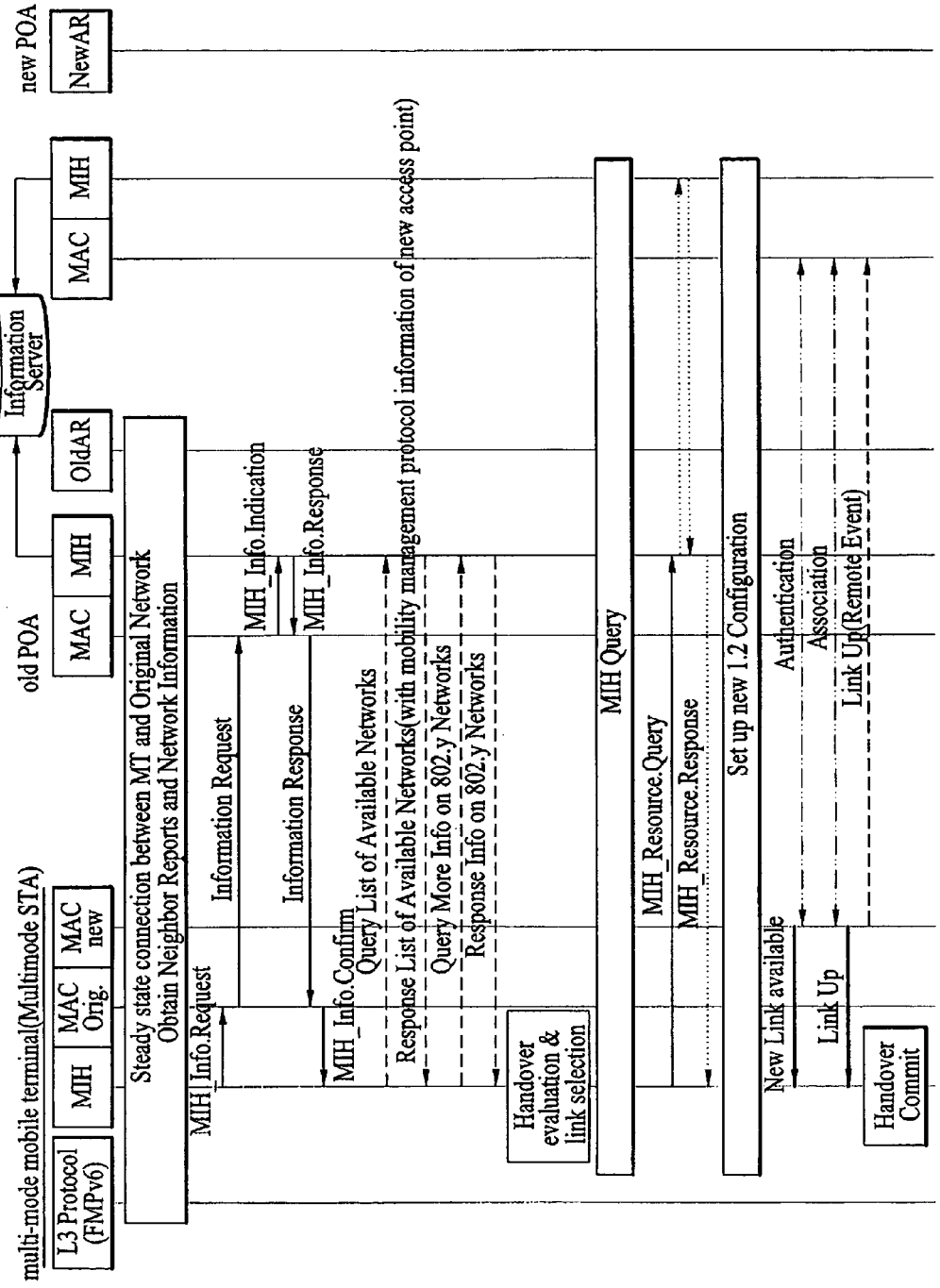
FIG. 23 is a flow chart illustrating an IP address setup procedure in accordance with one embodiment of the present invention.

FIG. 23 is a flow chart illustrating an IP address setup procedure in accordance with one embodiment of the present invention. Preferably, a method for allowing a mobile terminal to receive mobility management protocol information of a new network via the information service is shown in FIG. 23.

Referring to FIG. 23, in accordance with one embodiment of the present invention, a parameter similar to the aforementioned mobility management protocol support type bitmap is contained in a "Query(Response) List of Available Networks" message (i.e., a signal message between the MIH of the mobile terminal and the MIH of the current point of attachment (POA) or access point), such that the mobile terminal can receive mobility management protocol information supported by a corresponding network.

Figure 24:
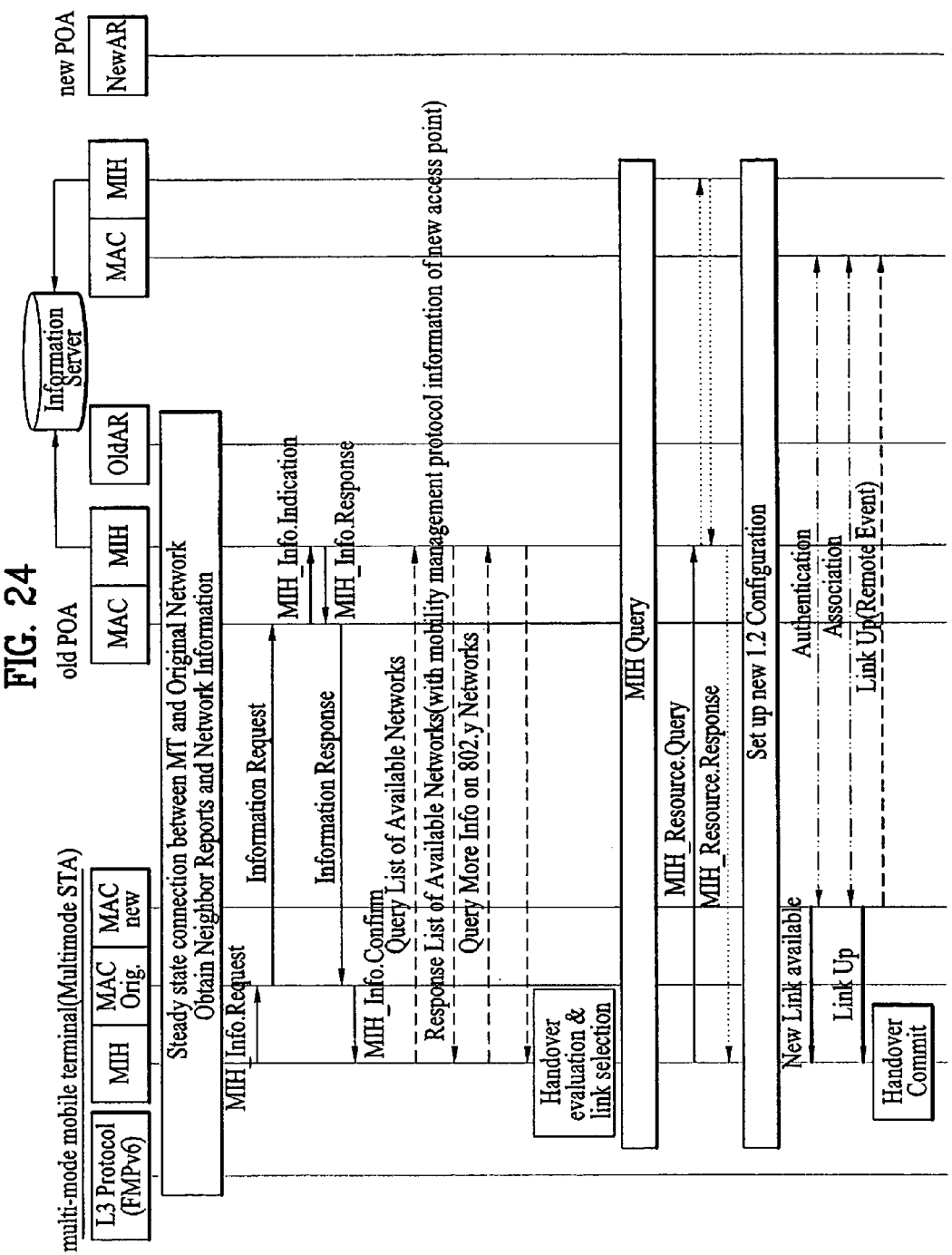
FIG. 24 is a flow chart illustrating an IP address setup procedure in accordance with one embodiment of the present invention.

FIG. 24 is a flow chart illustrating an IP address setup procedure in accordance with one embodiment of the present invention. Preferably, a method for allowing a mobile terminal to receive mobility management protocol information of a new network via the information service is shown in FIG. 24.

Referring to FIG. 24, in accordance with one embodiment of the present invention, a parameter similar to the aforementioned mobility management protocol support type bitmap is contained in a "Query More(Response) Info on 802.y Networks" message (i.e., a signal message between the MIH of the mobile terminal and the MIH of the current point of attachment (POA) or access point), such that the mobile terminal can receive mobility management protocol information supported by a corresponding network.

Figure 25:
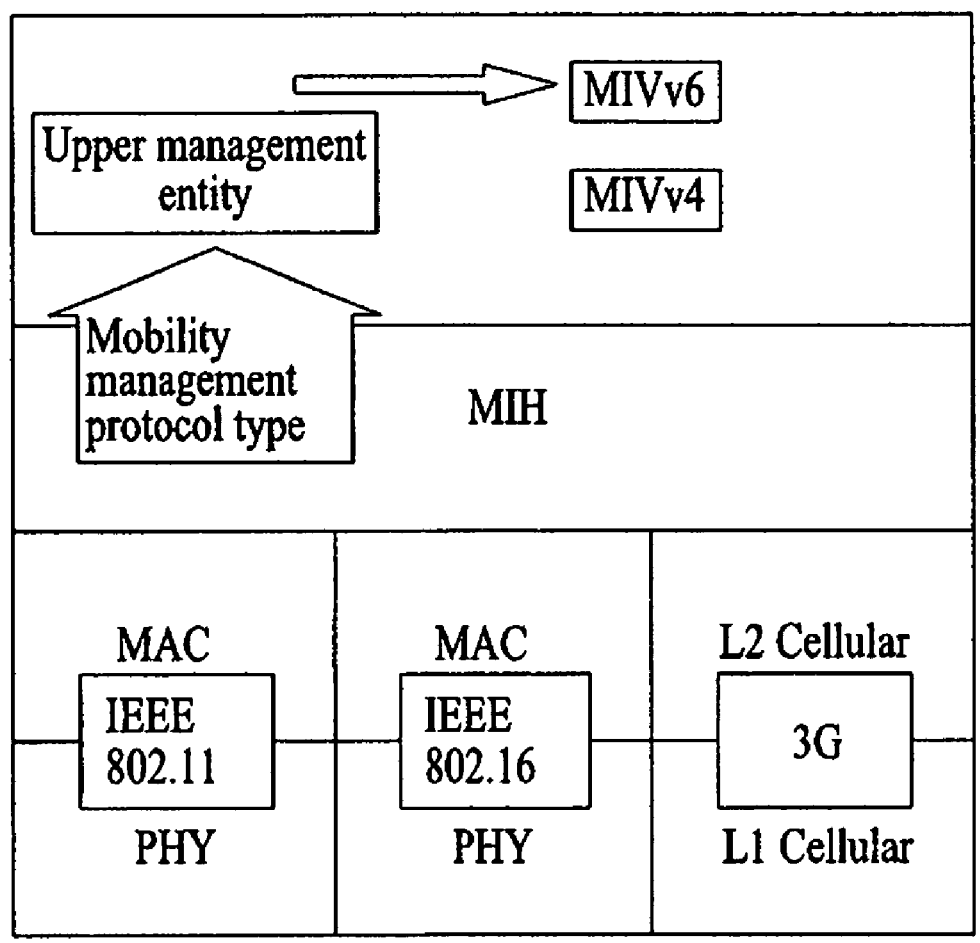
FIG. 25 is a structural diagram illustrating a protocol stack structure including an upper management entity in accordance with one embodiment of the present invention.

FIG. 25 is a structural diagram illustrating a protocol stack structure including an upper management entity in accordance with one embodiment of the present invention. Referring to FIG. 25, if a multi-mode mobile terminal is handed over from an IEEE 802.11 network (i.e., an old network) supporting a mobile IPv4 mobility management protocol to an IEEE 802.16 network (i.e., a new network) supporting an MIPv6 mobility management protocol, a method for transmitting mobility management protocol information supported by the aforementioned IEEE 802.16 network (i.e., the new network) using the inventive event service of the present invention is depicted in FIG. 25 using a protocol stack structure.

If a mobile terminal acting as a multi-mode mobile terminal is handed over to a new network, the MAC layer of the mobile terminal includes mobility management protocol type information supported by the new network in a predetermined event (e.g., "Link_Available" or "Link_Up"), and transmits the event equipped with the aforementioned mobility management protocol type information to an upper management entity. The upper management entity then transmits the "Link_Up" event to a corresponding mobility management protocol (i.e., MIPv6).

The method for providing the mobile terminal with the mobility management protocol information via an event service adds new parameters to the "Link_Up", "Link_Available" or "IP_Renewal_Indication" event in order to provide the mobile terminal with new mobility management protocol information supported by a new network. The mobile terminal recognizes a mobility management protocol supported by a new network via the aforementioned newly-added parameters. The aforementioned parameters include information associated with a current mobility management protocol. However, if a new mobility management protocol is to be developed in the future, associated information may also be added to the aforementioned parameters as necessary.

The newly-added parameter (i.e., a mobility management protocol support type bitmap) is indicative of various mobility management protocol types capable of being supported by the new network. A bit of "1" indicates that a corresponding mobility management protocol can be supplied from a network.

Figure 26:
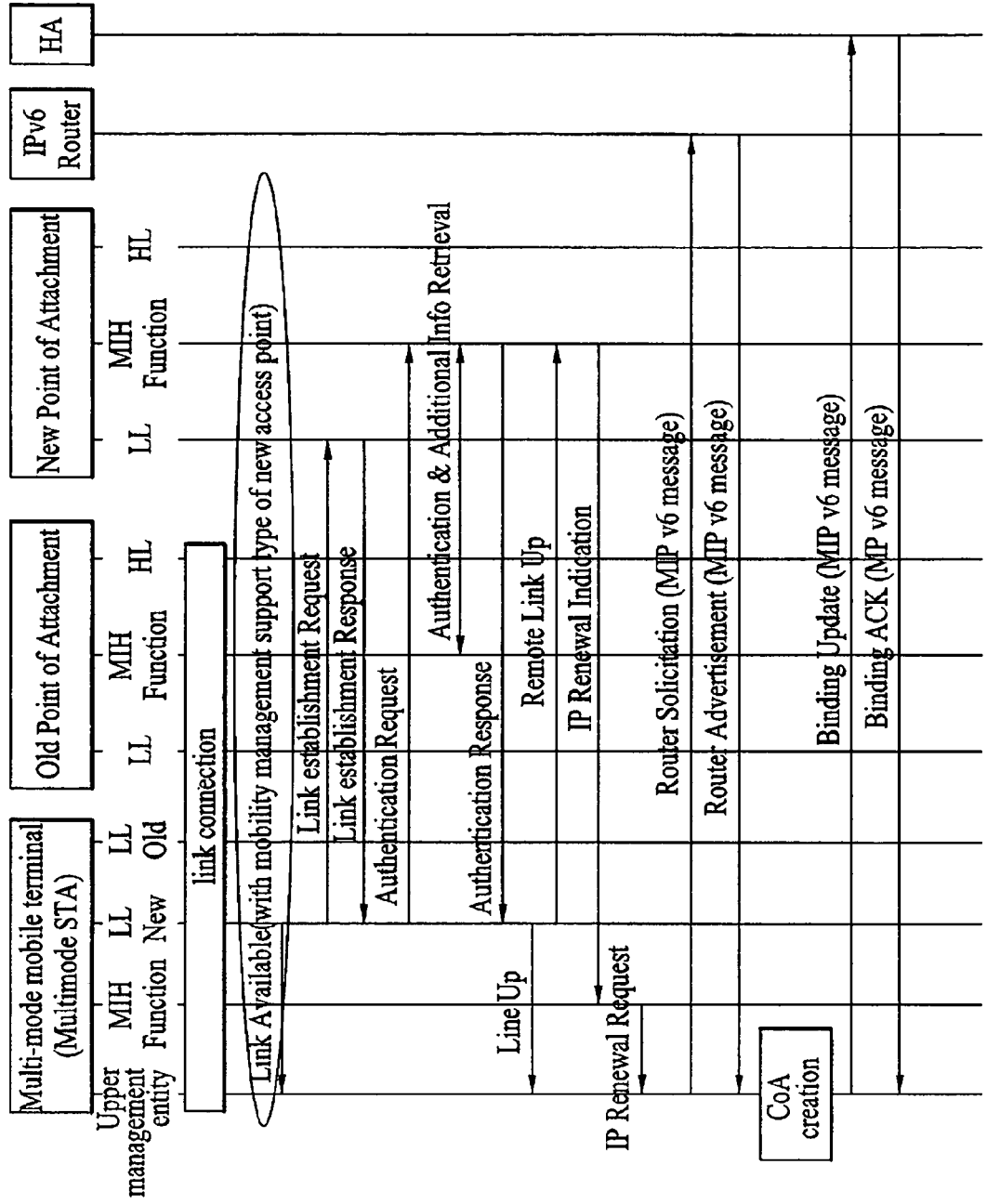
FIG. 26 is a flow chart illustrating an IP address setup procedure in accordance with one embodiment of the present invention.

FIG. 26 is a flow chart illustrating an IP address setup procedure in accordance with one embodiment of the present invention. Preferably, as shown in FIG. 26, if a mobile terminal equipped with a mobile Ipv4 mobility management protocol and a mobile IPv6 mobility management protocol accesses a network capable of supporting the mobile IPv4 mobility management protocol, and is then handed over to a new network for supporting the mobile IPv6 mobility management protocol, a mobility management protocol support type bitmap of the present invention is contained in a "Link_Available MIH" event. Accordingly, a mobility management protocol type supported by the new network is supplied to the mobile terminal before the mobile terminal establishes a connection state with the new network (i.e., new link). In accordance with the preferred embodiment shown in FIG. 26, the upper management entity includes an upper layer (e.g., L3 and above), a device manager, and a handover control function.

Preferably, a new lower layer (LL New), such as a new MAC layer, of the multi-mode mobile terminal acquires mobility management protocol information (e.g., mobile IPv6) of a new point of attachment (POA) using a scanning operation and other messages. The new MAC layer includes the acquired information in a "Link_Available MIH" event, and transmits the "Link_Available MIH" event including the acquired information to the upper management entity via the MIH function. Preferably, the upper management entity transmits mobility management protocol information associated with a corresponding point of attachment (POA) to the upper layer, such that it commands the corresponding mobility management protocol (i.e., mobile IPv6) to enter a "Link_Up" state. Thereafter, a network layer of the mobile terminal performs an IPv6 Care of Address (CoA) setup procedure to acquire a new CoA, and registers the new CoA with a home agent.

Figure 27:
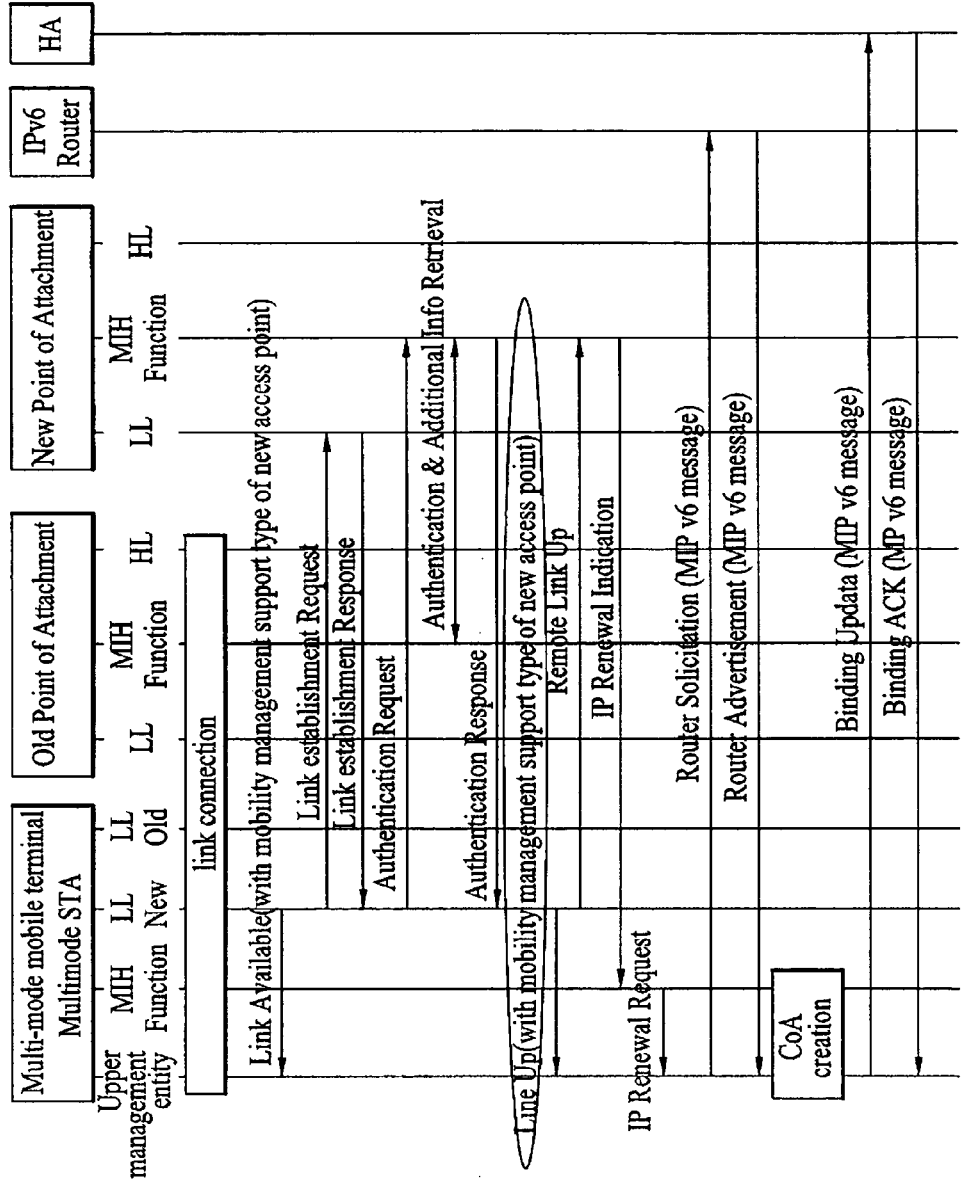
FIG. 27 is a flow chart illustrating an IP address setup procedure in accordance with one embodiment of the present invention.

FIG. 27 is a flow chart illustrating an IP address setup procedure in accordance with one embodiment of the present invention. Preferably, a method for allowing the mobile terminal to receive mobility management protocol information associated with a new network via a "Link_Up" event is shown in FIG. 27.

Preferably, as shown in FIG. 27, if a mobile terminal equipped with a mobile Ipv4 mobility management protocol and a mobile IPv6 mobility management protocol accesses a network capable of supporting the mobile IPv4 mobility management protocol, and is then handed over to a new network supporting the mobile IPv6 mobility management protocol, a mobility management protocol support type bitmap of the present invention is contained in the "Link_Up" event. Accordingly, a mobility management protocol type supported by the new network is supplied to the mobile terminal before the network layer handover procedure is executed. In accordance with the preferred embodiment shown in FIG. 26, the upper management entity includes an upper layer (e.g., L3 and above), a device manager, and a handover control function.

Preferably, a new lower layer (LL New), such as a new MAC layer, of the multi-mode mobile terminal establishes a connection state with a new link via a "Link establishment Request/Response" message, such that it acquires mobility management protocol information (e.g., MIPv6) of a new point of attachment (POA).

Thereafter, if the multi-mode mobile terminal establishes a connection state with the new link, the "Link_Up MIH" event including the mobility management protocol information is transmitted to the MIH layer. The MIH layer then transmits a corresponding event service to a corresponding mobility management protocol (MIPv6) by referring to the mobility management protocol support type bitmap of the trigger "Link_Up" event.

Figure 28:
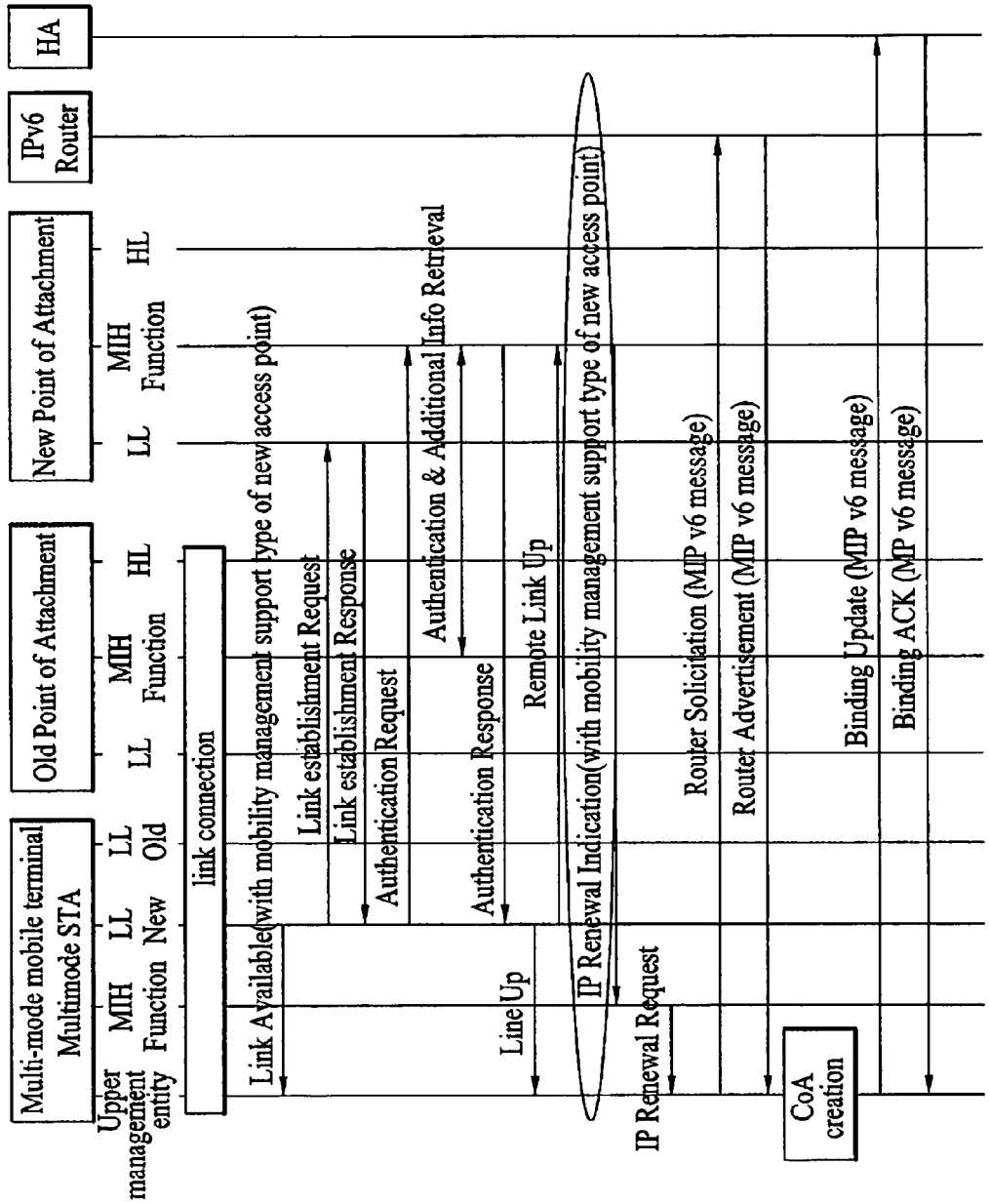
FIG. 28 is a flow chart illustrating an IP address setup procedure in accordance with one embodiment of the present invention.

FIG. 28 is a flow chart illustrating an IP address setup procedure in accordance with one embodiment of the present invention. Preferably, a method for allowing the mobile terminal to receive mobility management protocol information associated with a new network via an "IP_Renewal_Indication" event is shown in FIG. 28.

Preferably, as shown in FIG. 28, if a mobile terminal equipped with a mobile Ipv4 mobility management protocol and a mobile IPv6 mobility management protocol accesses a network capable of supporting the mobile IPv4 mobility management protocol, and is then handed over to a new network supporting the mobile IPv6, a mobility management protocol support type bitmap of the present invention is contained in the "IP_Renewal_Indication" event. Accordingly, a mobility management protocol type supported by the new network is supplied to the mobile terminal before the network layer handover procedure is executed. In accordance with the preferred embodiment shown in FIG. 28, the upper management entity includes an upper layer (e.g., L3 and above), a device manager, and a handover control function.

Preferably, a new point of attachment (POA) of the mobile terminal receives a "Remote Link_Up MIH" event from the mobile terminal. The new POA then transmits an "IP_Renewal_Indication Link" event, including mobility management protocol information supplied from a network of the mobile terminal, to the upper management entity. The upper management entity then transmits an "IP_Renewal_Request" event to a corresponding mobility management protocol (MIPv6) by referring to the mobility management protocol support type bitmap of the "IP_Renewal_Indication Link" event.

The above-mentioned preferred embodiment shows an example in which the "IP_Renewal_Indication" trigger signal occurs after a link setup between the mobile terminal and a new point of attachment (POA) is completed. However, provided that the old POA acquires IP address information of the new POA using an inter-MIH signal message (i.e., a signal message between MIH functions), the old POA can provide the aforementioned "IP_Renewal_Indication" trigger signal before the mobile terminal establishes a link with the new POA.

Figure 29:
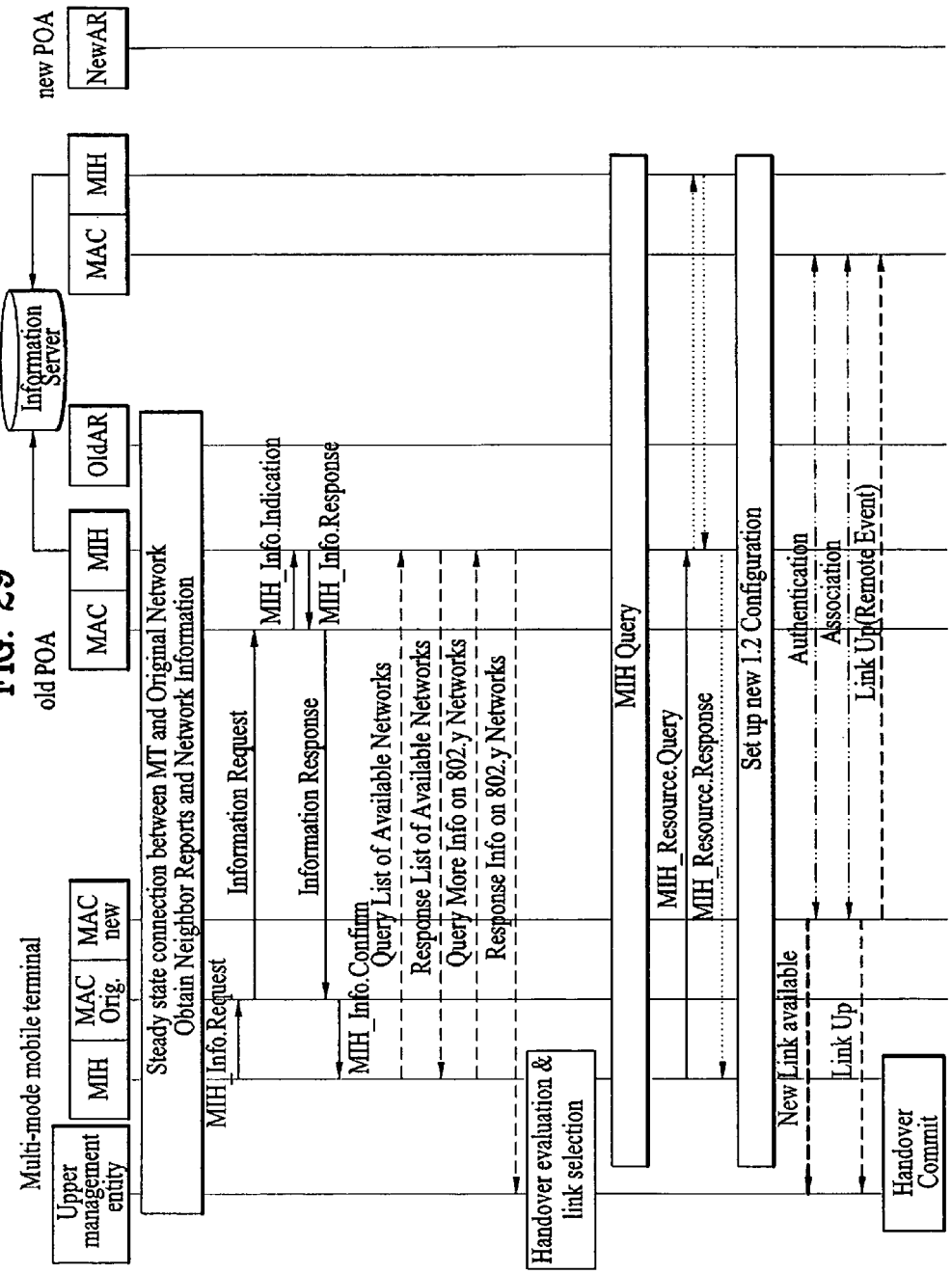
FIG. 29 is a flow chart illustrating an IP address setup procedure in accordance with one embodiment of the present invention.

FIG. 29 is a flow chart illustrating an IP address setup procedure in accordance with one embodiment of the present invention. Preferably, a method for allowing the mobile terminal to receive mobility management protocol information associated with a new network via an information service is shown in FIG. 29.

As shown in FIG. 29, a parameter similar to the aforementioned mobility management protocol support type bitmap is contained in a "Query(Response) List of Available Networks" message (i.e., a signal message between the MIH of a mobile terminal and the MIH of a current point of attachment (POA) or access point), and is then transmitted to an upper management entity, such that the upper management entity can receive mobility management protocol information supported by a corresponding network.

Figure 30:
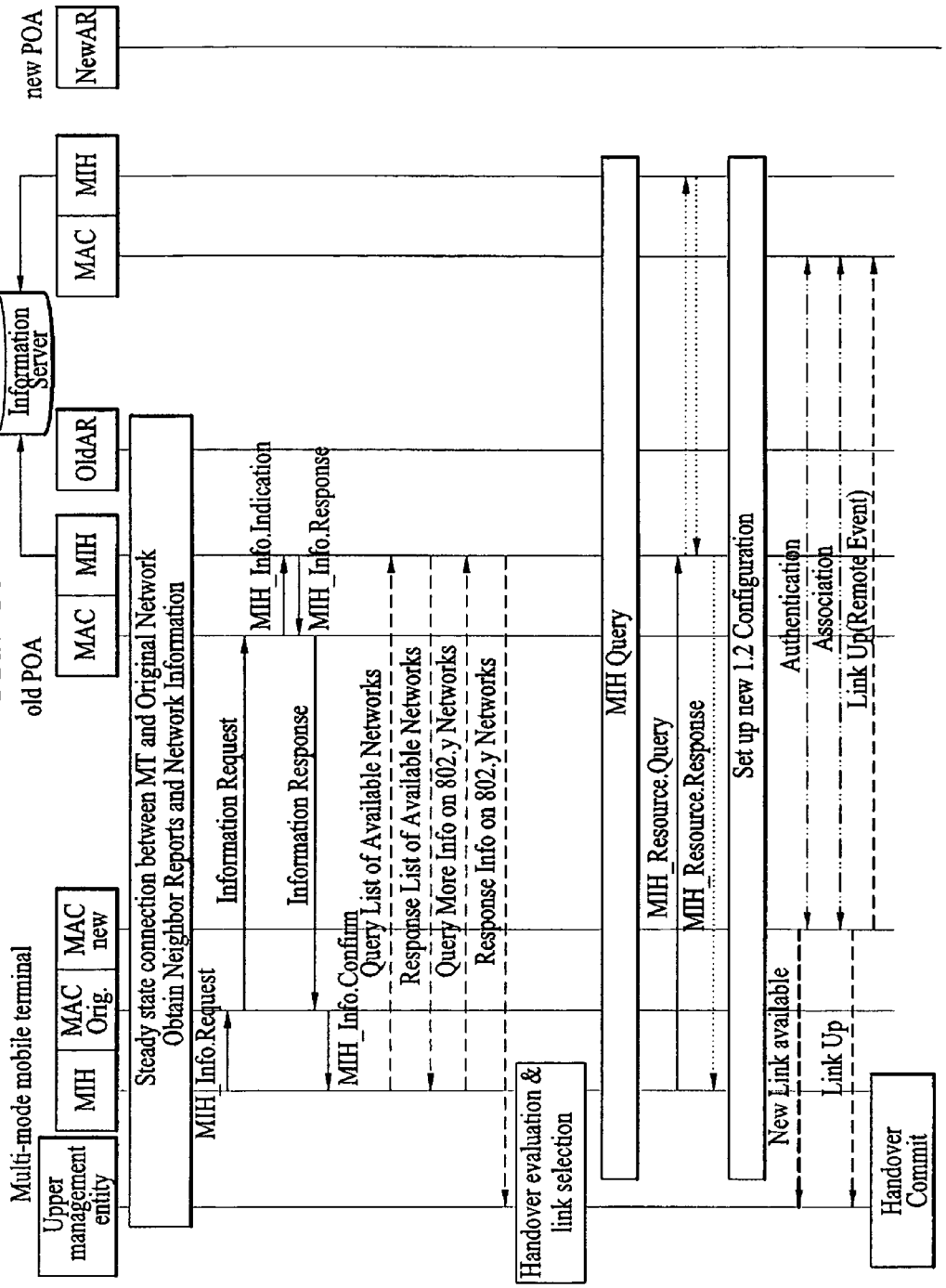
FIG. 30 is a flow chart illustrating an IP address setup procedure in accordance with one embodiment of the present invention.

FIG. 30 is a flow chart illustrating an IP address setup procedure in accordance with one embodiment of the present invention. Preferably, a method for allowing the mobile terminal to receive mobility management protocol information associated with a new network via the information service is shown in FIG. 30.

As shown in FIG. 30, a parameter similar to the aforementioned mobility management protocol support type bitmap is contained in a "Query More(Response) Info on 802.y Networks" message (i.e., a signal message between the MIH of the mobile terminal and the MIH of the current point of attachment (POA) or access point), and is then transmitted to an upper management entity, such that the upper management entity can receive mobility management protocol information supported by a corresponding network.

Figure 31:
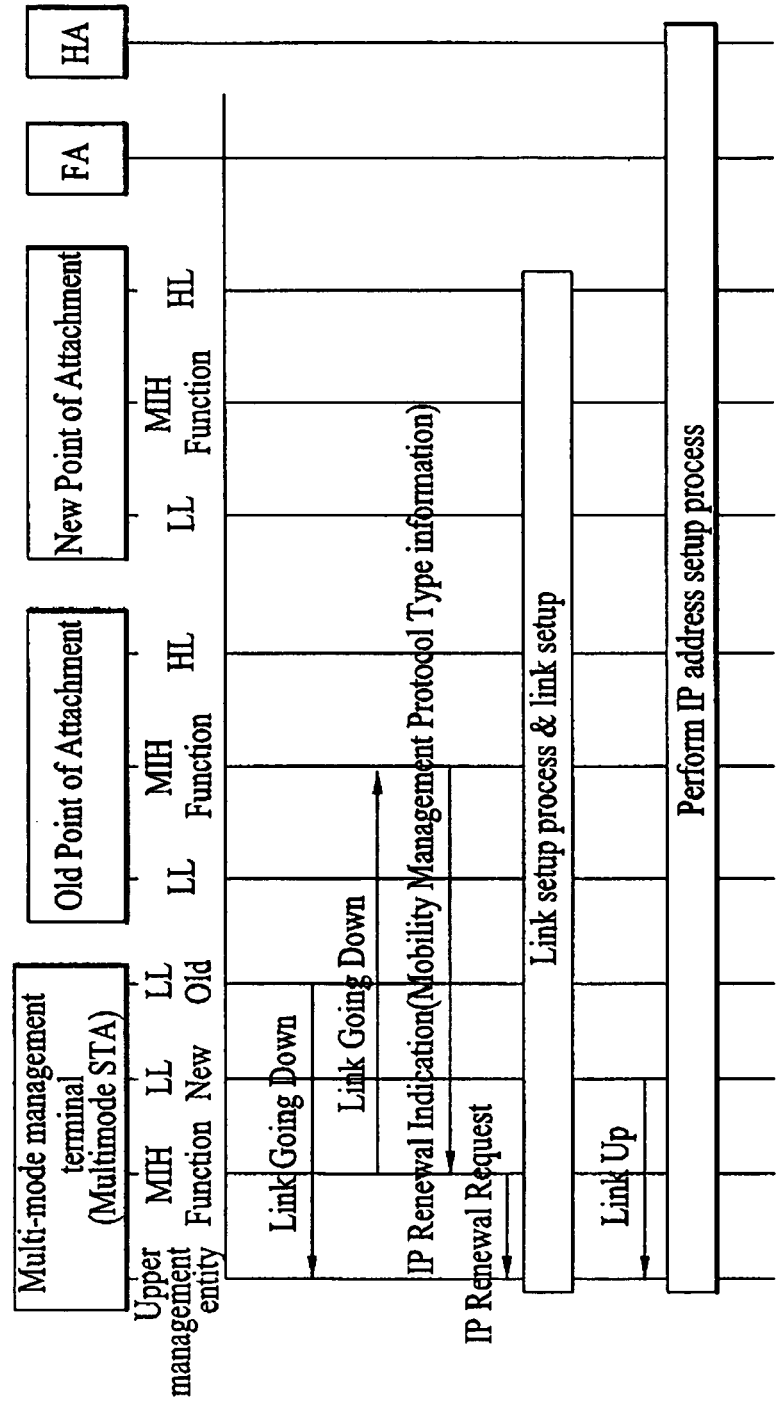
FIG. 31 is a flow chart illustrating an IP address setup procedure in accordance with one embodiment of the present invention.

FIG. 31 is a flow chart illustrating an IP address setup procedure in accordance with one embodiment of the present invention. Referring to FIG. 31, similar to the aforementioned preferred embodiment of FIG. 28, although the mobility management protocol type information is contained in an "IP_Renewal_Indication" trigger signal, the "IP_Renewal_Indication" trigger signal occurs after the mobile terminal transmits a remote "Link_Going_Down" trigger signal to an old POA. The old POA receives the remote "Link_Going_Down" trigger signal from the mobile terminal, acquires IP-associated information associated with a new POA by the inter-MIH signal message, includes the acquired IP-associated information in the "IP_Renewal_Indication" trigger signal, and finally transmits the "IP_Renewal_Indication" trigger signal including the new POA's IP-associated information to the mobile terminal.

Although the above-mentioned preferred embodiments of the present invention use the mobile IPv4 and the mobile IPv6 mobility management protocols as examples, it should be noted that the scope or spirit of the present invention is not limited to only the mobile IPv4 and the mobile IPv6, and is also applicable to other examples and modifications.

As apparent from the above description, a handover method for a mobile communication system according to the present invention previously provides a mobile terminal with mobility management protocol information supported by a new network via an event service or an information service, when a multi-mode mobile terminal equipped with a plurality of mobility management protocols is handed over to a new interface network.

Therefore, the present invention greatly reduces a delay time consumed while the mobile terminal recognizes that it cannot be further operated by an old mobility management protocol of an old network in the new network, and establishes a Care of Address (CoA) using a new mobility management protocol of the new network, such that the new CoA can be quickly established without generating a damaged packet and an extended service time.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for receiving information in a mobile terminal, the method comprising:
    establishing a second layer (L2) connection with an accessible link of a heterogeneous network; and
    receiving in a unified interface a Link Up message comprising an Internet protocol (IP) renewal indicator and at least one of a link identifier, an address of an old access router and an address of a new access router, from a lower layer when the second layer (L2) connection with the accessible link is established, the unified interface being located above the lower layer in the mobile terminal and managing messages to and from the heterogeneous network, wherein the IP renewal indicator indicates whether an IP address is to be changed,
    wherein the Link Up message further comprises information indicating a type of mobility management protocol supported by the heterogeneous network,
    wherein the information comprises a bitmap comprising bits, each bit being indicative of whether a corresponding type of mobility management protocol supported or not by the heterogeneous network, and
    wherein Link Up message is sent from the unified interface to an upper layer.

2. The method of claim 1, wherein the unified interface is a media independent handover function (MIHF) entity.

3. The method of claim 1, wherein the upper layer comprises at least one mobility management protocol.

4. The method of claim 3, wherein at least part of the Link Up message is sent to a specific mobility management protocol based on the information.

5. The method of claim 3, wherein at least part of the Link Up message is sent to at least one of the at least one mobility management protocol.

6. The method of claim 1, further comprising establishing the network address for the heterogeneous network.

7. The method of claim 1, wherein the first information and the second information are received when a second layer (L2) connection with the accessible link is established and the accessible link is available for use.

8. A method for providing information to a mobile terminal, the method comprising:
    establishing a second layer (L2) connection with an accessible link of a heterogeneous network; and
    sending at a unified interface a Link Up message comprising an Internet protocol (IP) renewal indicator and at least one of a link identifier, an address of an old access router and an address of a new access router, to an upper layer to notify that the second layer (L2) connection with the accessible link is established, the unified interface being located under the upper layer in the mobile terminal and managing messages to and from the heterogeneous network, wherein the IP renewal indicator indicates whether an IP address is to be changed,
    wherein the Link Up message further comprises information indicating a type of mobility management protocol supported by the heterogeneous network,
    wherein the information comprises a bitmap comprising bits, each bit being indicative of whether a corresponding type of mobility management protocol is supported or not by the heterogeneous network, and
    wherein the Link Up message is received at the unified interface from a lower layer.

9. The method of claim 8, wherein the unified interface is a media independent handover function (MIHF) entity.

10. The method of claim 8, wherein the upper layer comprises at least one mobility management protocol.

11. The method of claim 10, wherein at least part of the Link Up message is sent to a specific mobility management protocol based on the information.

12. The method of claim 10, wherein at least part of the Link Up message is sent to at least one of the at least one mobility management protocol.

13. A mobile terminal for receiving mobility management protocol information, the mobile terminal comprising:
    a unified interface for managing messages to and from a heterogeneous network; and
    means for establishing a second layer (L2) connection with an accessible link of the heterogeneous network,
    wherein the unified interface receives a Link Up message comprising an Internet protocol (IP) renewal indicator and at least one of a link identifier, an address of an old access router and an address of a new access router, from a lower layer when the second layer (L2) connection with the accessible link is established, the unified interface being located above the lower layer in the mobile terminal, wherein the IP renewal indicator indicates whether an IP address is to be changed,
    wherein the Link Up message further comprises information indicating a type of mobility management protocol supported by the heterogeneous network,
    wherein the information comprises a bitmap comprising bits, each bit being indicative of whether a corresponding type of mobility management protocol is supported or not by the heterogeneous network, and
    wherein the Link Up message is sent from the unified interface to an upper layer.

14. The mobile terminal of claim 13, wherein the unified interface is a media independent handover function (MIHF) entity.

15. The mobile terminal of claim 13, wherein the upper layer comprises at least one mobility management protocol.

16. The mobile terminal of claim 15, wherein at least part of the Link Up message is sent to a specific mobility management protocol based on the information.

17. The mobile terminal of claim 15, wherein at least part of the Link Up message is sent to at least one of the at least mobility management protocol.

18. The mobile terminal of claim 13, further comprising means for establishing the network address for the heterogeneous network.

19. A mobile terminal for receiving mobility management protocol information, the mobile terminal comprising:
a unified interface for managing messages to and from a heterogeneous network; and
means for establishing a second layer (L2) connection with an accessible link of the heterogeneous network,
wherein the unified interface sends a Link Up message comprising an Internet protocol (IP) renewal indicator and at least one of a link identifier, an address of an old access router and an address of a new access router, to an upper layer to notify that the second layer (L2) connection with the accessible link is established, the unified interface being located under the upper layer, wherein the IP renewal indicator indicates whether an IP address is to be changed,
wherein the Link Up message further comprises information indicating a type of mobility management protocol supported by the heterogeneous network,
wherein the information comprises a bitmap comprising bits, each bit being indicative of whether a corresponding type of mobility management protocol is supported or not by the heterogeneous network, and
wherein the Link Up message is received at the unified interface from a lower layer.

20. The mobile terminal of claim 19, wherein the unified interface is a media independent handover function (MIHF) entity.

21. The mobile terminal of claim 19, wherein the upper layer comprises at least one mobility management protocol.

22. The mobile terminal of claim 21, wherein at least art of the message is sent to a specific mobility management protocol based on the information.

23. The mobile terminal of claim 21, at least part of the Link Up message is sent to at least one of the at least mobility management protocol.

* * * * *